United States Patent
Farley et al.

(10) Patent No.: US 6,800,692 B2
(45) Date of Patent: Oct. 5, 2004

(54) METALLOCENE-PRODUCED VERY LOW DENSITY POLYETHYLENES

(75) Inventors: James McLeod Farley, League City, TX (US); Richard Wayne Halle, Houston, TX (US); George Panagopoulous, Cypress, TX (US); Donna Sue Davis, Beaumont, TX (US); Douglas J. Laurent, Appleton, WI (US); Alan M. Malakoff, Houston, TX (US); David M. Simpson, The Woodlands, TX (US); Kevin Cable, Waynesville, NC (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/311,528

(22) PCT Filed: Jun. 22, 2001

(86) PCT No.: PCT/US01/19934

§ 371 (c)(1),
(2), (4) Date: Mar. 24, 2003

(87) PCT Pub. No.: WO02/00436

PCT Pub. Date: Jan. 3, 2002

(65) Prior Publication Data

US 2003/0215659 A1 Nov. 20, 2003

Related U.S. Application Data

(60) Provisional application No. 60/213,571, filed on Jun. 22, 2000, provisional application No. 60/243,208, filed on Oct. 25, 2000, provisional application No. 60/270,802, filed on Feb. 23, 2001, provisional application No. 60/278,560, filed on Mar. 23, 2001, provisional application No. 60/278,315, filed on Mar. 23, 2001, and provisional application No. 60/278,567, filed on Mar. 23, 2001.

(51) Int. Cl.$^7$ .................. C08F 8/00; C08L 23/04; C08L 33/04; C08L 35/02; C08L 45/00

(52) U.S. Cl. .............. 525/191; 525/216; 525/232; 525/240

(58) Field of Search .................. 525/191, 216, 525/232, 240

(56) References Cited

U.S. PATENT DOCUMENTS

| 5,376,439 A | * | 12/1994 | Hodgson et al. ............ 428/220 |
| 5,382,631 A | | 1/1995 | Stehling et al. ............. 525/240 |
| 6,419,966 B1 | * | 7/2002 | Davis .......................... 426/106 |
| 6,558,760 B1 | * | 5/2003 | Paleari et al. .............. 428/34.8 |
| H2073 H | * | 7/2003 | Culotta ....................... 525/240 |

FOREIGN PATENT DOCUMENTS

| EP | 0241234 | 10/1987 |
| WO | WO 9406857 | 3/1994 |
| WO | WO 9722470 | 6/1997 |

* cited by examiner

Primary Examiner—Nathan M. Nutter
(74) Attorney, Agent, or Firm—Andrew B. Griffis

(57) ABSTRACT

The present invention provides a polymer blend suitable for use as a film or a coating, the polymer blend including from 1 to 99% by weight of a metallocene-produced VLDPE polymer having a density less than 0.916 g/cm$^3$, and from 1 to 99% by weight of an LDPE polymer having a density of from 0.916 to 0.928 g/cm$^3$ wherein the sum of (a) and (b) is 100%. The VLDPE polymer can have a melt index of from 6 to 15 dg/min, or from 9 to 12 dg/min. The present invention further provides polymeric films extrusion cast from such polymer blends, and articles having a flexible substrate and a polymeric film extrusion-coated on the substrate

33 Claims, No Drawings

METALLOCENE-PRODUCED VERY LOW DENSITY POLYETHYLENES

This application claims the benefit of U.S. Provisional Application No. 60/213,571, filed Jun. 22, 2000; U.S. Provisional Application No. 60/243,208, filed Oct. 25, 2000; U.S. Provisional Application No. 60/270,802, filed Feb. 23, 2001; U.S. Provisional Application No. 60/278,560, filed Mar. 23, 2001; U.S. Provisional Application No. 60/278,315, filed Mar. 23, 2001; and U.S. Provisional Application No. 60/278,567 filed Mar. 23, 2001, the entire disclosures of which are hereby incorporated by reference.

1. FIELD OF THE INVENTION

The present invention relates generally to very low density polyolefins and films produced from very low density polyolefins. More specifically, the present invention is directed to very low density polyethylenes produced using metallocene catalysts, and cast extrusion films formed of metallocene-very low density polyethylenes having improved sealing and mechanical properties relative to conventional low density polyethylene films.

2. BACKGROUND

A variety of polymeric materials have been used successfully in thin cast films. A typical film casting process includes the steps of polymer extrusion, melt feeding through a slot die, melt draw-down in the air gap, chill-roll casting, edge-trim slitting, surface treating if necessary, and winding. The polyolefin film can be extruded onto a substrate of paper, metal foil, or other flexible substrate material to form an extrusion coated substrate. Extrusion of multiple layers of polymeric materials, including polyolefins as well as other materials, a process sometimes termed "coextrusion", is also well known.

A variety of polymerization processes have been used to make polyolefins, including polyethylene and polypropylene, suitable for extrusion coating applications. Such processes include gas-phase polymerization, solution polymerization and bulk polymerization. More specifically, gas phase polymerization processes using Ziegler-Natta or vanadium-based catalyst systems have been used to make "low density polyethylenes" ("LDPEs"), i.e., polyethylenes having densities of from 0.916 to 0.928 g/cm$^3$; "medium density polyethylenes" ("MDPEs"), i.e., polyethylenes having densities of from 0.929 to 0.940 g/cm$^3$; and "high density polyethylenes" ("HDPEs"), i.e., polyethylenes having densities greater than 0.940.

The low density polyethylene extrusion coating market is dominated by conventional LDPE made in a high-pressure process. LDPE is generally preferred because it is easy to extrude, has high melt strength thereby minimizing neck-in, and has good sealing characteristics. Linear low density polyethylene ("LLDPE") offers improved coating toughness, but its relatively narrow molecular weight distribution makes it more difficult to extrude, and it has relatively poor sealing properties; LLDPE makes up about 5% of the low density polyethylene extrusion market.

Although LDPE and LLDPE are widely used, these materials suffer from several disadvantages in extrusion coating applications. In applications requiring adhesion of a coating to polypropylene, LDPE and LLDPE offer relatively poor adhesion, thus necessitating the extra expense and complexity of an adhesive or tic layer. It would thus be desirable to have a polyethylene-based extrusion coating material capable of improved adhesion to polypropylene substrates. In addition, it would be desirable to have an extrusion coating material offering improved mechanical properties and improved sealing performance. Further, it would be desirable to have an extrusion coating material capable of being formed in thinner layer than is conventionally possible with LDPE and LLDPE. Still farther, it would be desirable to have an extrusion coating material providing better organoleptic properties than LLDPE.

U.S. Pat. No. 5,382,631 discloses linear interpolymer blends made from components having narrow molecular weight distribution (e.g. Mw/Mn≦3) and a narrow composition distribution (e.g. CDBI>50%/). The blends have either Mw/Mn>3 and/or CDBI<50%, and combinations of each, and can be bimodal with respect to either or both molecular weight and/or comonomer content. The blends are generally free of blend components having both a higher average molecular weight and a lower average comonomer content than another blend component.

3. SUMMARY OF THE INVENTION

In one embodiment, the present invention is directed to a polymer blend, the blend including a very low density polyethylene (VLDPE) polymer having a density of less than 0.916 g/cm$^3$, and a low density polyethylene (LDPE) polymer, having a density of from 0.916 to 0.940 g/cm$^3$. Preferably the VLDPE and LDPE polymers are metallocene-catalyzed polymers.

In another embodiment, the present invention provides a polymer blend suitable for use as a film or a coating, the polymer blend including from 1 to 99% by weight of a metallocene-produced VLDPE polymer having a density less than 0.916 g/cm$^3$, and from 1 to 99% by weight of an LDPE polymer having a density of from 0.916 to 0.928 g/cm$^3$ wherein the sum of VLDPE and the LDPF is 100%. Alternatively, the blend can have from 5 to 95%, from 10 to 90%, or from 15 to 85% by weight of the LDPE polymer. The VLDPE polymer can have a melt index of from 6 to 15 dg/min, or from 9 to 12 dg/min. The VLDPE polymer can be an ethylene homopolymer, or a copolymer of ethylene and a $C_3$ to $C_{12}$ alpha-olefin. The LDPE polymer can have a melt index of from 0.5 to 15 dg/min, or from 1 to 10 dg/min. The LDPE polymer can be an ethylene homopolymer, or a copolymer of ethylene and a $C_3$ to $C_{12}$ alpha-olefin.

In another embodiment, the present invention is directed to a polymer blend, the blend including a gas-phase metallocene-produced VLDPE polymer, the VLDPE polymer being a copolymer of ethylene and at least one $C_3$ to $C_{12}$ alpha olefin and having a density of from 0.900 to 0.915 g/cm$^3$ and a melt index of from 5 to 20 g/10 min; and a metallocene-produced LDPE polymer, the LDPE polymer being a copolymer of ethylene and at least one $C_3$ to $C_{12}$ alpha olefin and having a density of from 0.916 to 0.940 g/cm$^3$ and a melt index of from 0.5 to 15 g/10 min. In this embodiment, the blend includes 5–95% by weight of the VLDPE polymer and 95–5% by weight of the LDPE polymer, based on the total weight of the VLDPE and LDPE polymers.

In another embodiment, the present invention is directed to a polymer blend, the blend including a gas-phase metallocene-produced VLDPE polymer, the VLDPE polymer being a copolymer of ethylene and 1-butene, 1-hexene or 1-octene and having a density of from 0.910 to 0.915 g/cm$^3$, a melt index of from 5 to 20 g/10 min, a composition distribution breadth index (CDBI) of 60 to 80 wt % and a molecular weight distribution (MWD) of 2.2 to 2.8; and a metallocene-produced LDPE polymer, the LDPE polymer being a copolymer of ethylene and 1-butene, 1-hexene or 1-octene and having a density of from 0.916 to 0.925 g/Cm$^3$ and a melt index of from 0.5 to 10 g/10 min. In this embodiment, the blend preferably includes 10–90% by weight of the VLDPE polymer and 90–10% by weight of the LDPE polymer, based on the total weight of the VLDPE and LDPE polymers.

In one embodiment, the present invention is directed to a VLDPE/LDPE polymer blend, the blend including a metallocene-produced VLDPE polymer comprising an ethylene copolymer with a comonomer content of 25% or less by weight, preferably 20% or less by weight, and more preferably 15% or less by weight.

In another embodiment, the present invention is directed to a polymer blend, the blend including from 1 to 99% by weight of a copolymer derived from ethylene and one or more $C_3$–$C_{20}$ alpha olefin comonomers, and from 1 to 99% by weight of a low density polyethylene polymer having a density of from 0.916 to 0.928 g/cm$^3$, wherein the sum of the weight of the copolymer and low density polyethylene polymer is 100%. The copolymer is further characterized by properties including one or more of the following: a comonomer content of from 5 to 15 wt. %, a density of less than 0.916 g/cm$^3$, a composition distribution breadth index in the range of from 55% to 70%, a molecular weight distribution Mw/Mn of from 2 to 3, and a molecular weight distribution Mz/Mw of less than 2.

In another embodiment, the present invention is directed to an article, the article including a substrate and a film disposed on the substrate. The film includes a polymer blend, the polymer blend including from 1 to 99% by weight of a copolymer derived from ethylene and one or more $C_3$–$C_{20}$ alpha olefin comonomers, and from 1 to 99% by weight of a low density polyethylene polymer having a density of from 0.916 to 0.928 g/cm$^3$, wherein the sum of the weight of the copolymer and the low density polyethylene polymer is 100%. The copolymer is further characterized by properties including one or more of the following: a comonomer content of from 5 to 15 wt. %, a density of less than 0.916 g/cm$^3$, a composition distribution breadth index in the range of from 55% to 70%, a molecular weight distribution Mw/Mn of from 2 to 3, and a molecular weight distribution Mz/Mw of less than 2.

In another embodiment, the present invention is directed to a polymer blend composition, the composition including (a) a copolymer derived from ethylene and one or more $C_3$–$C_{20}$ alpha olefin comonomers and (b) a low density polyethylene polymer having a density of from 0.916 to 0.928 g/cm$^3$. The copolymer is further characterized by properties including one or more of the following: a comonomer content of from 5 to 15 wt. %, a density of less than 0.916 g/cm$^3$, a composition distribution breadth index in the range of from 55% to 70%, a molecular weight distribution Mw/Mn of from 2 to 3, a molecular weight distribution Mw/Mw of less than 2, and a bi-modal composition distribution.

In another embodiment, the present invention is directed to a monolayer film formed from a blend including (a) a copolymer derived from ethylene and one or more $C_3$–$C_{20}$ alpha olefin comonomers and (b) a low density polyethylene polymer having a density of from 0.916 to 0.928 g/cm$^3$. The copolymer is further characterized by properties including one or more of the following: a comonomer content of from 5 to 15 wt. %, a density of less than 0.916 g/cm$^3$, a composition distribution breadth index in the range of from 55% to 70%, a molecular weight distribution Mw/Mn of from 2 to 3, a molecular weight distribution Mz/Mw of less than 2, and a bi-modal composition distribution.

In another embodiment, the present invention is directed to a multilayer film, the film including a first layer and a second layer, and at least one of the layers including a polymer blend composition. The polymer blend composition includes (a) a copolymer derived from ethylene and one or more $C_3$–$C_{20}$ alpha olefin comonomers and (b) an LDPE polymer having a density of from 0.916 to 0.928 g/cm$^3$. The copolymer is further characterized by properties including one or more of the following: a comonomer content of from 5 to 15 wt. %, A density of less than 0.916 g/cm$^3$, a composition distribution breadth index in the range of from 55% to 70%, a molecular weight distribution Mw/Mn of from 2 to 3, a molecular weight distribution Mz/Mw of less than 2, and a bi-modal composition distribution.

In another embodiment, the present invention is directed to a polymer blend composition, the composition including a metallocene-catalyzed linear very low density polyethylene polymer and a low density polyethylene polymer having a density of from 0.916 to 0.928 g/cm$^3$. The very low density polyethylene polymer is further characterized by properties including one or more of the following: a density of less than 0.916 g/cm$^3$, a composition distribution breadth index of 50 to 85% by weight, a molecular weight distribution Mw/Mn of 2 to 3, and a molecular weight distribution Mz/Mw of less than 2.

Polyethylene has Two Peaks in a TREF Measurement

In another embodiment, the present invention provides a polymeric film, the film being extrusion cast from a blend of a metallocene-produced VLDPE polymer and an LDPE, as described above.

In another embodiment, the present invention is directed to monolayer films formed from the polymer blends of the invention.

In another embodiment, the present invention is directed to multilayer films, wherein at least one layer of the multilayer film is formed of a polymer blend of the invention.

In other embodiments, the invention is directed to articles including the films of the invention, articles wrapped with the films of the invention, and substrates coated with the films of the invention.

In another embodiment, the present invention provides an article of manufacture, the article including a flexible substrate and a polymeric film extrusion-coated on the substrate, wherein the polymeric film is a blend of a metallocene-produced VLDPE polymer and an LDPE as described above. The substrate can be a flexible material, such as paper, a metal foil, a flexible polymeric material, or other flexible substrate capable of being coated.

The blends and films of the present invention show improved mechanical and/or sealing properties, relative to prior art LDPE and LLDPE materials.

4. DETAILED DESCRIPTION

4.1 VLDPE Polymers

The polymer blends and films of the present invention include a very low density polyethylene (VLDPE) polymer. As used herein, the terms "very low density polyethylene" polymer and "VLDPE" polymer refer to a polyethylene homopolymer or preferably copolymer having a density of less than 0.916 g/cm$^3$. Polymers having more than two types of monomers, such as terpolymers, are also included within the term "copolymer" as used herein. The comonomers that are useful in general for making VLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include conjugated and non-conjugated dienes, acetylene, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the VLDPE polymer and the specific comonomers selected. In general, the comonomer will be present in an amount of from 0 to 15% by weight, typically 5 to 15% by weight for preferred comonomers such as butene, hexene and octene. It is well-understood in the art that, for a given comonomer, the density of the VLDPE polymer produced therefrom decreases as the comonomer content increases. One skilled in the art can readily determine the appropriate comonomer content appropriate to produce a VLDPE polymer having a desired density.

The VLDPE polymer has a density of less than 0.916 g/cm³, and preferably at least 0.890 g/cm³, more preferably at least 0.900 g/cm³. Thus, a preferred density range for the VLDPE polymer is 0.900 g/cm³ to 0.915 g/cm³. Alternate lower limits of the VLDPE polymer density include 0.905 g/cm³ or 0.910 g/cm³.

The VLDPE polymer is further characterized by a melt index (MI) of from 0.5 to 20 g/10 min (dg/min), as measured in accordance with ASTM-1238 condition E. In one or more specific embodiments, alternative lower limits for the melt index include 0.7 and 1.0 g/10 min, and alternative upper limits for the melt index include 5, 10 and 15 g/10 min, with melt index ranges from any lower limit to any upper limit being within the scope of the invention.

In one embodiment, the VLDPE polymer is made in a metallocene-catalyzed polymerization process. As used herein, the terms "metallocene-catalyzed VLDPE," "metallocene-produced VLDPE," or "m-VLDPE" refer to a VLDPE polymer having the density and melt index properties described herein, and being produced in the presence of a metallocene catalyst. One skilled in the art will recognize that a metallocene-catalyzed VLDPE polymer has measurable properties distinguishable from a VLDPE polymer having the same comonomers in the same weight percentages but produced from a different process, such as a conventional Ziegler-Natta polymerization process.

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and an be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

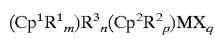

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. Bridged structures can be meso-configurations or racemic stereoisomers, or a mixture thereof. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group 15 or 16 of the periodic table of the elements. These monocyclopentadienyl complexes have the general formula $$(Cp^1R^1{}_m)R^3{}_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group VA or a coordination number of two from group VIA, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the m-VLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable bridged biscyclopentadienyl metallocenes of the type described in group (1) above are the racemic isomers of:

μ-(CH$_3$)$_2$Si(indenyl)$_2$M(Cl)$_2$;
μ-(CH$_3$)$_2$Si(indenyl)$_2$M(CH$_3$)$_2$;
μ-(CH$_3$)$_2$Si(tetrahydroindenyl)$_2$M(Cl)$_2$;
μ-(CH$_3$)$_2$Si(tetrahydroindenyl)$_2$M(CH$_3$)$_2$;
μ-(CH$_3$)$_2$Si(indenyl)$_2$M(CH$_2$CH$_3$)$_2$; and
μ-(C$_6$H$_5$)$_2$C(indenyl)$_2$M(CH$_3$)$_2$;
wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-(C$_6$H$_5$)$_2$C(cyclopentadienyl)(fluorenyl)M(R)$_2$;
μ-(C$_6$H$_5$)$_2$C(3-methylcyclopentadienyl)(fluorenyl)M(R)$_2$;
μ-(CH$_3$)$_2$C(cyclopentadienyl)(fluorenyl)M(R)$_2$;
μ-(C$_6$H$_5$)$_2$C(cyclopentadienyl)(2-methylindenyl)M(CH$_3$)$_2$;
μ-(C$_6$H$_5$)$_2$C(3-methylcyclopentadienyl)(2-methylindenyl)M(Cl)$_2$;
μ-(C$_6$H$_5$)$_2$C(cyclopentadienyl)(2,7-dimethylfluorenyl)M(R)$_2$; and
μ-(CH$_3$)$_2$C(cyclopentadienyl)(2,7-dimethylfluorenyl)M(R)$_2$;
wherein M is Zr or Hf, and R is Cl or CH$_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of preferred monocyclopentadienyl metallocenes of the type described in group (2) above are:

μ-(CH$_3$)$_2$Si(cyclopentadienyl)(1-adamantylamido)M(R)$_2$;
μ-(CH$_3$)$_2$Si(3-tertbutylcyclopentadienyl)(1-adamantylamido)M(R)$_2$;
μ-(CH$_2$(tetramethylcyclopentadienyl)(1-adamantylamido)M(R)$_2$;
μ-(CH$_3$)$_2$Si(tetramethylcyclopentadienyl)(1-adamantylamido)M(R)$_2$;
μ-(CH$_3$)$_2$C(tetramethylcyclopentadienyl)(1-adamantylamido)M(R)$_2$;
μ-(CH$_3$)$_2$Si(tetramethylcyclopentadienyl)(1-tertbutylamido)M(R)$_2$;
μ-(CH$_3$)$_2$Si(fluorenyl)(1-tertbutylamido)M(R)$_2$;
μ-(CH$_3$)$_2$Si(tetramethylcyclopentadienyl)(1-cyclododecylamido)M(R)$_2$;
and
μ-(C$_6$H$_5$)$_2$C(tetramethylcyclopentadienyl)(1-cyclododecylamido)M(R)$_2$;
wherein M is Ti, Zr or Hf, and R is Cl or CH$_3$.

Another class of organometallic complexes that are useful catalysts for the VLDPE polymers described herein are those with diimido ligand systems, such as are described in WO 96/23010.

The metallocene compounds are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

An additional method of making metallocene catalysts uses ionizing anionic pre-cursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:

trialkyl-substituted ammonium salts such as:
    triethylammonium tetraphenylborate;
    tripropylammonium tetraphenylborate;
    tri(n-butyl)ammonium tetraphenylborate;
    trimethylammonium tetrakis(p-tolyl)borate;
    trimethylammonium tetrakis(o-tolyl)borate;
    tributylammonium tetrakis(pentafluorophenyl)borate;
    tripropylammonium tetrakis(o,p-dimethylphenyl)borate;
    tributylammonium tetrakis(m,m-dimethylphenyl)borate;
    tributylammonium tetrakis(p-trifluoromethylphenyl)borate;
    tributylammonium tetrakis(pentafluorophenyl)borate; and
    tri(n-butyl)ammonium tetrakis(o-tolyl)borate;
N,N-dialkyl anilinium salts such as:
    N,N-dimethylanilinium tetrakis(pentafluorophenyl)borate;
    N,N-dimethylaniliniumtetrakis(heptafluoronaphthyl)borate;
    N,N-dimethylanilinium tetrakis(perfluoro-4-biphenyl)borate;
    N,N-dimethylanilinium tetraphenylborate;
    N,N-diethylanilinium tetraphenylborate; and
    N,N-2,4,6-pentamethylanilinium tetraphenylborate;
dialkyl ammonium salts such as:
    di-(isopropyl)ammonium tetrakis(pentafluorophenyl)borate; and
    dicyclohexylammonium tetraphenylborate; and
triaryl phosphonium salts such as:
    triphenylphosphonium tetraphenylborate;
    tri(methylphenyl)phosphonium tetraphenylborate; and
    tri(dimethylphenyl)phosphonium tetraphenylborate.

Further examples of suitable anionic precursors include those including a stable carbonium ion, and a compatible non-coordinating anion. These include:
    tropillium tetrakis(pentafluorophenyl)borate;
    triphenylmethylium tetrakis(pentafluorophenyl)borate;
    benzene (diazonium) tetrakis(pentafluorophenyl)borate;
    tropillium phenyltris(pentafluorophenyl)borate;
    triphenylmethylium phenyl-(trispentafluorophenyl)borate;
    benzene (diazonium) phenyl-tris(pentafluorophenyl)borate;
    tropillium tetrakis(2,3,5,6-tetrafluorophenyl)borate;
    triphenylmethylium tetrakis(2,3,5,6-tetrafluorophenyl)borate;
    benzene (diazonium) tetrakis(3,4,5-trifluorophenyl)borate;
    tropillium tetrakis(3,4,5-trifluorophenyl)borate;
    benzene (diazonium) tetrakis(3,4,5-trifluorophenyl)borate;
    tropillium tetrakis(3,4,5-trifluorophenyl)aluminate;
    triphenylmethylium tetrakis(3,4,5-trifluorophenyl)aluminate;
    benzene (diazonium) tetrakis(3,4,5-trifluorophenyl)aluminate;
    tropillium tetrakis(1,2,2-trifluoroethenyl)borate;
    triphenylmethylium tetrakis(1,2,2-trifluoroethenyl)borate;
    benzene (diazonium) tetrakis(1,2,2-trifluoroethenyl)borate;
    tropillium tetrakis(2,3,4,5-tetrafluorophenyl)borate;
    triphenylmethylium tetrakis(2,3,4,5-tetrafluorophenyl)borate; and
    benzene (diazonium) tetrakis(2,3,4,5-tetrafluorophenyl)borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula (R—Al—O)$_n$, which is a cyclic compound, or R(R—Al—O)$_n$AlR$_2$, which is a linear compound. In these formulae, each R or R$_2$ is a C$_1$ to C$_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Preferably, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst.

The catalyst system is preferably supported on a carrier, typically an inorganic oxide or chloride or a resinous material such as polyethylene. Preferably, the catalyst system includes a metallocene component with single or multiple cyclopentadienyl components reacted with either a metal alkyl or alkoxy component or an ionic compound component. These catalysts can include partially and/or fully activated precursor compositions. The catalysts may be modified by prepolymerization or encapsulation. Specific metallocenes and catalyst systems useful in practicing the invention are disclosed in WO 96/11961, and WO 96/11960. Other non-limiting examples of metallocene catalysts and catalyst systems are discussed in U.S. Pat. Nos. 4,808,561, 5,017,714, 5,055,438, 5,064,802, 5,124,418, 5,153,157 and 5,324,800.

The invention VLDPEs can be made using a gas phase polymerization process. As used herein, the term "gas phase polymerization" refers to polymerization of polymers from monomers in a gas fluidized bed. Generally, the VLDPEs of the present invention may be made by polymerizing alpha-olefins in the presence of a metallocene catalyst under reactive conditions in a gas phase reactor having a fluidized bed and a fluidizing medium. In a specific embodiment, the VLDPE polymer can be made by polymerization in a single reactor (as opposed to multiple reactors). As discussed in greater detail below, a variety of gas phase polymerization processes may be used. For example, polymerization may be conducted in uncondensed or "dry" mode, condensed mode, or "super-condensed mode." In a specific embodiment, the liquid in the fluidizing medium can be maintained at a level greater than 2 weight percent based on the total weight of the fluidizing medium.

The material exiting the reactor includes a very low density polyethylene (VLDPE), having a density from 0.890 to 0.915 g/cm$^3$, more preferably a density from 0.910 to 0.915 g/cm$^3$, and a stream containing unreacted monomer gases. Following polymerization, the polymer is recovered. In certain embodiments, the stream can be compressed and cooled, and mixed with feed components, whereupon a gas phase and a liquid phase are then returned to the reactor.

In a preferred aspect, the invention VLDPEs are copolymers, made from ethylene monomers together with at least one comonomer, e.g., hexene or octene. Polymers having more than two types of monomers, such as terpolymers, are also included within the term "copolymer" as used herein. For example, VLDPE terpolymers may be made, using ethylene monomer together with any two of butene, hexene and octene. For one embodiment of the VLDPE polymer comprising an ethylene/butene copolymer, the molar ratio of butene to ethylene should be from about 0.015 to 0.035, preferably from 0.020 to 0.030. For one embodiment of the VLDPE polymer comprising an ethylene/hexene copolymer, the molar ratio of hexene to ethylene should be from about 0.015 to 0.035, preferably from 0.020 to 0.030. For one embodiment of the VLDPE polymer comprising an ethylene/octene copolymer, the molar ratio of octene to ethylene should be from about 0.015 to 0.035, preferably from 0.020 to 0.030.

The comonomers that are useful in general for making VLDPE copolymers include α-olefins, such as C$_3$–C$_{20}$ α-olefins and preferably C$_3$–C$_{12}$ α-olefins. The α-olefin comonomer can be linear or branched, and two or more comonomers can be used, if desired. Examples of suitable comonomers include linear C$_3$–C$_{12}$ α-olefins, and α-olefins having one or more C$_1$–C$_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene, more preferably 1-butene, 1-hexene, and 1-octene.

Although not generally preferred, other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene;

methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the VLDPE polymer and the specific comonomers selected. In general, the comonomer may be present in an amount of 25% or less by weight, preferably 20% or less by weight and more preferably 15% or less by weight. In one embodiment, the comonomer may be present in an amount of 5% or more by weight. For a given comonomer, the density of the VLDPE polymer produced therefrom decreases as the comonomer content increases. One skilled in the art can readily determine the appropriate comonomer content appropriate to produce a VLDPE polymer having a desired density.

Generally, in carrying out the gas phase polymerization processes described herein, the reactor temperature can be in the range of 50° C. to 110° C., sometimes higher. However, the reactor temperature should not exceed the melting point of the VLDPE being formed. A typical reactor temperature is 80° C. The reactor pressure should be 100 to 1000 psig (689 kPa to 6,895 kPa), preferably 150 to 600 psig (1034 to 4137 kPa), more preferably 200 to 500 psig (1379 to 3448 kPa) and most preferably 250 to 400 psig (1723 to 2758 kPa).

Preferably, the process is operated in a continuous cycle. A specific, non-limiting embodiment of the gas phase polymerization process that is operated in a continuous cycle will now be described, it being understood that other forms of gas polymerization may also be used.

A gaseous stream containing one or more monomers is continuously passed through a fluidized bed under reactive conditions in the presence of a metallocene catalyst. This gaseous stream is withdrawn from the fluidized bed and recycled back into the reactor. Simultaneously, polymer product may be withdrawn from the reactor and new monomer or monomers are added to replace the reacted monomer(s). In one part of the cycle, in a reactor, a cycling gas stream is heated by the heat of polymerization. This heat is removed in another part of the cycle by a cooling system external to the reactor. Heat generated by the reaction may be removed in order to maintain the temperature of the gaseous stream inside the reactor at a temperature below the polymer and catalyst degradation temperatures. Further, it is often desirable to prevent agglomeration or formation of chunks of polymer that cannot be removed as product. This may be accomplished in a variety of ways known in the art, such as, for example, through control of the temperature of the gaseous stream in the reaction bed to a temperature below the fusion or sticking temperature of the polymer particles produced during the polymerization reaction.

Heat should be removed, since the amount of polymer produced in the fluidized bed polymerization process is generally related to the amount of heat that can be withdrawn from a reaction zone in a fluidized bed within the reactor. During the gas phase polymerization process, heat can be removed from the gaseous recycle stream by cooling the stream outside the reactor. The velocity of the gaseous recycle stream in a fluidized bed process should be sufficient to maintain the fluidized bed in a fluidized state. In certain conventional fluidized bed reactors, the amount of fluid circulated to remove the heat of polymerization is often greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream should be regulated.

The recycle stream can be cooled to a temperature below the dew point, resulting in condensing a portion of the recycle stream, as described in U.S. Pat. Nos. 4,543,399 and 4,588,790. As set forth in those patents, the resulting stream containing entrained liquid should be returned to the reactor without the aforementioned agglomeration and/or plugging that may occur when a liquid is introduced during the fluidized bed polymerization process. For purposes of this patent, this intentional introduction of a liquid into a recycle stream or reactor during the process is referred to generally as a "condensed mode" operation of the gas phase polymerization process. As taught by the above mentioned patents, when a recycle stream temperature is lowered to a point below its dew point in condensed mode operation, an increase in polymer production is possible, as compared to production in a "non-condensing" or "dry" mode, because of increased cooling capacity. Also, a substantial increase in space time yield, the amount of polymer production in a given reactor volume, can be achieved by operating in condensed mode with little or no change in product properties. Also, in certain condensed mode operations, the liquid phase of the two-phase gas/liquid recycle stream mixture remains entrained or suspended in the gas phase of the mixture. The cooling of the recycle stream to produce this two-phase mixture results in a liquid/vapor equilibrium. Vaporization of the liquid occurs when heat is added or pressure is reduced. The increase in space time yields are the result of this increased cooling capacity of the recycle stream which, in turn, is due both to the greater temperature differential between the entering recycle stream and the fluidized bed temperature and to the vaporization of condensed liquid entrained in the recycle stream. In a specific non-limiting embodiment of the process described herein, a condensed mode of operation is utilized.

In operating the gas phase polymerization process to obtain the VLDPEs of this invention, the amount of polymer and catalyst, the operating temperature of the reactor, the ratio of comonomer(s) to monomer and the ratio of hydrogen to monomer should be determined in advance, so that the desired density and melt index can be achieved.

Although a variety of gas polymerization processes may be used to make the polyolefins of the present inventions, including non-condensed or dry mode, it is preferred to use any one of a variety of condensed mode processes, including the condensed mode processes described in the above patents, as well as improved condensed mode gas polymerization processes, such as those disclosed in U.S. Pat. Nos. 5,462,999, and 5,405,922. Other types of condensed mode processes are also applicable, including so-called "super-condensed mode" processes, as discussed in U.S. Pat. Nos. 5,352,749 and 5,436,304.

The condensable fluids that can be used in one of the condensed mode gas phase polymerization operations may include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, or mixtures thereof. The preferred inert condensable hydrocarbons are $C_4$ and $C_6$ saturated hydrocarbons. The condensable fluids may also include polymerizable condensable comonomers such as olefins, alpha-olefins, diolefins, diolefins containing at least one alpha-olefin or mixtures thereof including some of the aforementioned monomers which may be partially or entirely incorporated into the polymer product.

The density of the polyethylene having the improved properties of this invention ranges from 0.890 to 0.915 g/cm$^3$, preferably from 0.910 to 0.915 g/cm$^3$, more preferably from 0.911 to 0.913 g/cm$^3$. Preferably, the polymers have a melt index (MI) ranging from 0.01 to 20.0, preferably 0.5 to 15.0. Melt index is measured according to ASTM-1238 condition E.

The preferred gas-phase, metallocene VLDPE polymers can be further characterized by a narrow composition distribution. As is well known to those skilled in the art, the composition distribution of a copolymer relates to the uniformity of distribution of comonomer among the molecules of the polymer. Metallocene catalysts are known to incorporate comonomer very evenly among the polymer molecules they produce. Thus, copolymers produced from a catalyst system having a single metallocene component have a very narrow composition distribution, in that most of the polymer molecules will have roughly the same comonomer content, and within each molecule the comonomer will be randomly distributed. By contrast, conventional Ziegler-Natta catalysts generally yield copolymers having a considerably broader composition distribution, with comonomer inclusion varying widely among the polymer molecules.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a $Mn \geq 15,000$, where Mn is the number average molecular weight of the fraction. Any low weight fractions present generally represent a trivial portion of the VLDPE polymers. The remainder of this description and the appended claims maintain this convention of assuming all fractions have $Mn \geq 15,000$ in the CDBI measurement.

The VLDPE polymers can also be characterized by molecular weight distribution (MWD). Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., N.Y., (1989) 155–160; U.S. Pat. No. 4,540,753; Verstrate et al., *Macromolecules*, vol. 21, (1988) 3360; and references cited therein.

The VLDPE polymers recited in the claims below are preferably linear polymers, i.e., without long chain branching. As used in the present disclosure, the term "linear" is applied to a polymer that has a linear backbone and does not have long chain branching; i.e., a "linear" polymer is one that does not have the long chain branches characteristic of a SLEP polymer as defined in U.S. Pat. Nos. 5,272,236 and 5,278,272. Thus, a "substantially linear" polymer as disclosed in those patents is not a "linear" polymer because of the presence of long chain branching.

Preferred VLDPE polymers have one or more of the following characteristics, in addition to the density, melt index, and other parameters described herein:

(a) a composition distribution CDBI of 50 to 85%, alternatively 60 to 80%, or 55 to 75%, or 55% or more to 70% or less;

(b) a molecular weight distribution MWD of 2 to 3, alternatively 2.2 to 2.8;

(c) a molecular weight distribution Mz/Mw of less than 2; and (d) the presence of two peaks in a TREF measurement.

Particularly preferred VLDPEs having some or all of these characteristics are the gas phase metallocene-produced VLDPEs described above.

Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method disclosed in the EXAMPLES section below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement than can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491–499 (1994).

A preferred balance of properties, particularly in film applications, according to the invention is achieved when the long chain branching of the VLDPE is reduced. Therefore, with respect to the catalyst structures described above, bis-Cp structures are preferred over mono-Cp structures, unbridged structures are preferred over bridged structures, and unbridged bis-Cp structures are the most preferred. Preferred catalyst systems which will minimize or eliminate long chain branching to produce polymers substantially free of or free of long chain branching are based on un-bridged bis-Cp zirconocenes, such as but not limited to bis (1-methyl-3-n-butyl cyclopentadiane) zirconium dichloride.

Symmetric metallocenes may be used to produce a VLDPE polymer of the present invention. Symmetric metallocenes include, but are not limited to, bis (methylcyclopentadienyl)zirconium dichloride, bis(1,3-dimethylcyclopentadienyl)zirconium dichloride, bis(1,2-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis (tetramethylcyclopentadienyl)zirconium dichloride, bis (pentamethylcyclopentadienyl)zirconium dichloride, bis (ethylcyclopentadienyl)zirconium dichloride, bis (propylcyclopentadienyl)zirconium dichloride, bis (butylcyclopentadienyl)zirconium dichloride, bis (isobutylcyclopentadienyl)zirconium dichloride, bis (pentylcyclopentadienyl)zirconium dichloride, bis (isopentylcyclopentadienyl)zirconium dichloride, bis (cyclopentylcyclopentadienyl)zirconium dichloride, bis (phenylcyclopentadienyl)zirconium dichloride, bis (benzylcyclopentadienyl)zirconium dichloride, bis (trimethylsilylmethylcyclopentadienyl)zirconium dichloride, bis(cyclopropylmethylcyclopentadienyl) zirconium dichloride, bis (cyclopentylmethylcyclopentadienyl)zirconium dichloride, bis(cyclohexylmethylcyclopentadienyl)zirconium dichloride, bis(propenylcyclopentadienyl)zirconium dichloride, bis(butenylcyclopentadienyl)zirconium dichloride, bis(1,3-ethylmethylcyclopentadienyl)zirconium dichloride, bis(1,3-propylmethylcyclopentadienyl) zirconium dichloride, bis(1,3-butylmethylcyclopentadienyl) zirconium dichloride, bis(1,3-isopropylmethylcyclopentadienyl)zirconium dichloride, bis (1,3-isobutylmethylcyclopentadienyl)zirconium dichloride, bis(1,3-methylcyclopentylcyclopentadienyl)zirconium dichloride, and bis(1,2,4-dimethylpropylcyclopentadienyl) zirconium dichloride.

Unsymmetric metallocenes may be used to produce a VLDPE polymer of the present invention. Unsymmetric metallocenes include, but are not limited to, cyclopentadienyl(1,3-dimethylcyclopentadienyl)zirconium dichloride, cyclopentadienyl(1,2,4-trimethylcyclopentadienyl)zirconium dichloride, cyclopentadienyl(tetramethylcyclopentadienyl)zirconium dichloride, cyclopentadienyl(pentamethylcyclopentadienyl) zirconium dichloride, cyclopentadienyl (propylcyclopentadienyl)zirconium dichloride, cyclopentadienyl(butylcyclopentadienyl)zirconium dichloride, cyclopentadienyl(pentylcyclopentadienyl) zirconium dichloride, cyclopentadienyl (isobutylcyclopentadienyl)zirconium dichloride, cyclopentadienyl(cyclopentylcyclopentadienyl)zirconium dichloride, cyclopentadienyl(isopentylcyclopentadienyl) zirconium dichloride, cyclopentadienyl (benzylcyclopentadienyl)zirconium dichloride, cyclopentadienyl(phenylcyclopentadienyl)zirconium dichloride, cyclopentadienyl(1,3-propylmethylcyclopentadienyl)zirconium dichloride, cyclopentadienyl(1,3-butylmethylcyclopentadienyl) zirconium dichloride, cyclopentadienyl(1,3-isobutylmethylcyclopentadienyl)zirconium dichloride, cyclopentadienyl(1,2,4-dimethylpropylcyclopentadienyl) zirconium dichloride, (tetramethylcyclopentadienyl) (methylcyclopentadienyl)zirconium dichloride, (tetramethylcyclopentadienyl)(1,3-dimethylcyclopentadienyl)zirconium dichloride, (tetramethylcyclopentadienyl)(1,2,4-trimethylcyclopentadienyl)zirconium dichloride, (tetramethylcyclopentadienyl)(propylcyclopentadienyl) zirconium dichloride, (tetramethylcyclopentadienyl) (cyclopentylcyclopentadienyl)zirconium dichloride, (pentamethylcyclopentadienyl)(methylcyclopentadienyl) zirconium dichloride, (pentamethylcyclopentadienyl)(1,3-dimethylcyclopentadienyl)zirconium dichloride, (pentamethylcyclopentadienyl)(>1,2,4-trimethylcyclopentadienyl)zirconium dichloride, (pentamethylcyclopentadienyl)(propylcyclopentadienyl) zirconium dichloride, (pentamethylcyclopentadienyl) (cyclopentylcyclopentadienyl)zirconium dichloride, cyclopentadienyl(ethyltetramentylcyclopentadienyl) zirconium dichloride, cyclopentadienyl (propyltetramentylcyclopentadienyl)zirconium dichloride, (methylcyclopentadienyl) (propyltetramentylcyclopentadienyl)zirconium dichloride, (1,3-dimethylcyclopentadienyl) (propyltetramentylcyclopentadienyl)zirconium dichloride, (1,2,4-trimethylcyclopentadienyl) (propyltetramentylcyclopentadienyl)zirconium dichloride, (propylcyclopentadienyl) (propyltetramentylcyclopentadienyl)zirconium dichloride, cyclopentadienyl(indenyl)zirconium dichloride, (methylcyclopentadienyl)(indenyl)zirconium dichloride, (1,3-dimethylcyclopentadienyl)(indenyl)zirconium dichloride, (1,2,4-trimethylcyclopentadienyl)(indenyl) zirconium dichloride, (tetramethylcyclopentadienyl) (indenyl)zirconium dichloride, (pentamethylcyclopentadienyl)(indenyl)zirconium dichloride, cyclopentadienyl(1-methylindenyl)zirconium dichloride, cyclopentadienyl(1,3-dimethylindenyl) zirconium dichloride, cyclopentadienyl(1,2,3-trimethylindenyl)zirconium dichloride, cyclopentadienyl(4, 7-dimethylindenyl)zirconium dichloride, (tetramethylcyclopentadienyl)(4,7-dimethylindenyl) zirconium dichloride, (pentamethylcyclopentadienyl)(4,7-dimethylindenyl)zirconium dichloride, cyclopentadienyl(5, 6-dimethylindenyl)zirconium dichloride, (pentamethylcyclopentadienyl)(5,6-dimethylindenyl) zirconium dichloride, and (tetramethylcyclopentadienyl)(5, 6-dimethylindenyl)zirconium dichloride.

The preferred method for producing the catalyst of the invention is described below and can be found in U.S. application Ser. No. 265,533, filed Jun. 24, 1994, now abandoned, and Ser. No. 265,532, filed Jun. 24, 1994, now abandoned, both are hereto fully incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and more preferably in the 1–1.5 times to 2.5–4 times range and most preferably in the 1.5 to 3 times range. Also, in the preferred embodiment, an antistatic agent is added to the catalyst preparation.

In one embodiment, the metallocene catalyst is prepared from silica dehydrated at 600° C. The catalyst is a commercial scale catalyst prepared in a mixing vessel with and agitator. An initial charge of 1156 pounds (462 Kg) toluene is added to the mixer. This was followed by mixing 925 pounds (421 Kg) of 30 percent by weight methyl aluminoxane in toluene. This is followed with 100 pounds (46 Kg) of 20 percent by weight bis(1,3-methyl-n-butyl cyclopentadienyl) zirconium dichloride in toluene (20.4 pounds (9.3 Kg) of contained metallocene). An additional 144 pounds (66 Kg) of toluene is added to the mixer to rinse the metallocene feed cylinder and allowed to mix for 30 minutes at ambient conditions. This is followed by 54.3 pounds (25 Kg) of an AS-990 in toluene, surface modifier solution, containing 5.3 pounds (2.4 Kg) of contained AS-990. An additional 100 pounds (46 Kg) of toluene rinsed the surface modifier container and was added to the mixer. The resulting slurry is vacuum dried at 3.2 psia (70.6 kPa) at 175° F. (79° C.) to a free flowing powder. The final catalyst weight was 1093 pounds (497 Kg). The catalyst can have a final zirconium loading of 0.40% and an aluminum loading of 12.0%.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume of a porous support is well known in the art. Details of one of these procedures is discussed in Volume 1, Experimental Methods in Catalytic Research (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1. component to the transition metal component is preferably in the range of ratios between 0.3:1 to 3:1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,352,749, 5,405,922, 5,436,304, 5,453,471 and 5,462,999 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment of the process of the invention the process is substantially free of a scavenger. For the purposes of this patent specification and appended claims the term "substantially free" is defined to be that during the process of the invention no more than 50 ppm of a scavenger based on the total weight of a fluidized bed is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment of the process of the invention the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment of the process of the invention during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e., ethylene or propylene) partial pressure. The preferred mole percent of the monomer, ethylene or propylene, is from about 25 to 90 mole percent and the monomer partial pressure is in the range of from about 75 psia (517 kPa) to about 300 psia (2069 kPa), which are typical conditions in a gas phase polymerization process.

When a scavenger is utilized in the process of the invention the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state. In one embodiment the scavenger can be introduced once, intermittently or continuously to the reactor system.

The scavenger used in the process of the invention is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of. Al are based on the total amount of scavenger used.

It is also preferred that hydrogen not be added to the system simultaneously with the scavenger. It is also within the scope of this invention that the scavenger can be introduced on a carrier separate from that used when a supported metallocene catalyst system is used in the process of the invention.

Fines for the purpose of this patent specification and appended claims are polymer particles less than 125 mu in size. Fines of this size can be measured by using a standard 120 mesh unit sieve screen. In a preferred embodiment the amount of scavenger present in the reactor at any given point in time during the process of the invention the level of fines less than 125 mu is less than 10%, preferably less than 1%, more preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated by the process of the invention that scavenger can be intermittently introduced during the process wherein greater than 90%, preferably greater than 95% of all the scavenger introduced is removed from the recycle stream.

It is also contemplated by this invention that the catalyst or catalyst system or components thereof of the invention can be used upon start-up as a scavenger, however, this would be an expensive procedure.

In the most preferred embodiment of the invention the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S. Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly. Fouling can also occur in the recycle gas piping and compressor, but usually accompanies plate and cooler fouling.

To quantify the rate of fouling it is useful to define a fouling factor, F. F is the fraction of the area of a hole that is fouled. If F=0 (0%) then there is no fouling. Conversely, if F=1 (100%) the hole is completely plugged. It is possible to relate the fouling to the pressure drop, DELTA P, at a given time in terms of the pressure drop of a clean system, DELTA P0. As fouling increases DELTA P increases and is larger than the initial pressure drop, DELTA P0. F is given by the following expressions: [See equation in original] (I) Cooler Fouling [See Original Patent for Chemical Structure Diagram] (II) In general, when F is greater than about 0.3 to about 0.4 (30–40%) a reactor shutdown is inevitable. Preferably, F is less than 40%, preferably less than 30%, even more preferably less than 20%, still more preferably less than 15% and most preferably less than 10% to 0%. The rate of fouling, the change in F as a function of time, is used to quantify fouling. If no fouling occurs the rate of fouling is zero. A minimum acceptable rate of fouling for a commercial operation is about 12 percent/month or 0.4 percent/day, preferably less than 0.3 percent/day, even more preferably less than 0.2 percent/day and most preferably less than 0.1 percent/day.

Particle size is determined as follows; the particle size is measured by determining the weight of the material collected on a series of U.S. Standard sieves and determining the weight average particle size.

Fines are defined as the percentage of the total distribution passing through 120 mesh standard sieve.

In one embodiment, the process is operated using a metallocene catalyst based on bis(1,3-methyl-n-butyl cyclopentadienyl) zirconium dichloride is described in this example. It shows the fouling effect of operating a commercial reactor using TEAL. This example includes information from a startup of a commercial reactor on metallocene catalyst.

Possible optimizations of the gas phase polymerization process and additional catalyst preparations are disclosed in U.S. Pat. Nos. 5,763,543, 6,087,291, and 5,712,352, and PCT published applications WO 00/02930 and WO 00/02931.

Although the VLPDE polymer component of the VLDPE/LDPE blends of the invention has been discussed as a single polymer, blends of two or more such VLDPE polymers, preferably two or more m-VLDPE polymers, having the properties described herein are also contemplated.

In any of the gas phase polymerization processes described herein, including those in the patents referenced herein, the unreacted monomers in the product stream may be recycled. Preferably, to make the VLDPEs of the invention with the desired density, the composition of the recycle stream should be carefully controlled so that the proper ratio of comonomers is maintained, as discussed above.

Another aspect of the invention relates to a polymer product containing any one of the very low density polyethylenes (VLDPEs) made using a gas phase polymerization process carried out in the presence of metallocene. Such polymer products preferably contain a sufficient amount of the VLDPE to provide them with improved properties such as the toughness properties described above in the Summary, e.g., the above-mentioned Dart Drop and/or Puncture values. Such products include a number of film-based products, such as films made from the VLDPEs, cast films, melt-blown films, coextruded films, films made of blends of VLDPE together with other polymers, laminated films, extrusion coatings, films with high oxygen transmission rates, multilayer films containing the VLDPEs, sealing layers and cling layers that contain the VLDPEs and products that include such sealing layers and cling layers. The blends of the invention have the VLDPE together with other polymers, such as LDPE, MDPE, HDPE, polypropylene and copolymers such as ethylene/propylene copolymers. This invention also includes products having specific end-uses, particularly film-based products for which the toughness properties are desirable, such as stretch films, shipping sacks, flexible and food packaging (e.g., fresh cut produce packaging), personal care films pouches, medical film products (such as IV bags), diaper backsheets and housewrap. Another product of this invention includes VLDPE that has been rendered breathable and used either alone (as a single layer film) or in combination with one or more other layers or films or fabrics, including woven or nonwoven films or fabrics. The products also include extrusion coating compositions containing the VLDPE. Several specific film and coating applications are described below.

4.2 The LDPE Component

The polymer blend also includes a low density polyethylene (LDPE) polymer. As used herein, the terms "low density polyethylene" polymer and "LDPE" polymer refer to a homopolymer or preferably copolymer of ethylene having a density of from 0.916 to 0.940 g/cm$^3$. Polymers having more than two types of monomers, such as terpolymers, are also included within the term "copolymer" as used herein. The comonomers that are useful in general for making LDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl sibstituents; 1-hexene with one or more methyl, ethyl or propyl substituents; 1-heptene with one or more methyl, ethyl or propyl substituents; 1-octene with one or more methyl, ethyl or propyl substituents; 1 nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6- octadiene; and 3,7-dimethyl-1,7-octadiene; (c) single ring alicyclic dienes, such as 1,4-cyclohexadiene; 15-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB); 5—propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-($\Delta$-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the LDPE polymer and the specific comonomers selected. One skilled in the art can readily determine the appropriate comonomer content appropriate to produce an LDPE polymer having a desired density.

The LDPE polymer has a density of 0.916 g/cm$^3$ to 0.940 g/cm$^3$, and preferably from 0.916 g/cm$^3$ to 0.925 g/cm$^3$. The LDPE polymer can have a melt index of from 0.5 to 20 g/10 min (dg/min), as measured in accordance with ASTM-1238 condition E. Alternative lower limits for the melt index include 0.7 and 1.0 g/10 min, and alternative upper limits for the melt index include 5, 10 and 15 g/10 min, with melt index ranges from any lower limit to any upper limit being within the scope of the invention.

The LDPE polymer can be produced using any conventional polymerization process and suitable catalyst, such as a Ziegler-Natta catalyst or a metallocene catalyst. Metallocene-catalyzed LDPE's (m-LDPE) are preferred. Particularly preferred m-LDPEs are the gas-phase, metallocene catalyzed LLPDEs described in WO 94/26816, the disclosure of which is incorporated herein by reference for purposes of U.S. patent practice. Examples of suitable LDPEs include the metallocene LDPEs commercially available under the tradename EXCEED™ from ExxonMobil Chemical Co., Houston, Tex., the Ziegler-Natta LDPEs available as ExxonMobil LL series LDPEs, from ExxonMobil Chemical Co., Houston, Tex., and the DOWLEX™ LDPE resins available from Dow Chemical Co.

Although the LLPDE polymer component of the VLDPE/LDPE blends of the invention has been discussed as a single polymer, blends of two or more such LDPE polymers, preferably two or more metallocene-catalyzed LDPE polymers, having the properties described herein are also contemplated.

4.3 VLDPE-LDPE Blends

In one embodiment, the present invention provides a polymer blend, the blend including a VLDPE polymer and an LDPE polymer. The blend can include any of the VLDPE polymers described herein, preferably a metallocene-catalyzed VLDPE polymer, and more preferably a gas-phase produced metallocene catalyzed VLDPE polymer. The blend can include any of the LDPE polymers described herein, preferably a metallocene-catalyzed LDPE polymer, and more preferably a gas-phase produced metallocene catalyzed LDPE polymer.

The blends can be formed using conventional equipment and methods, such a by dry blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly downstream of a polymerization process. Additionally, additives can be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; antistatic agents; pigments; colorants; dyes; waxes; silica; fillers; talc and the like.

The blends include at least 1 weight percent and up to 99 weight percent of the VLDPE polymer, and at least 1 weight percent and up to 99 weight percent of the LDPE polymer, with these weight percents based on the total weight of the VLDPE and LDPE polymers of the blend. Alternative lower limits of the VLDPE polymer can be 5%, 10%, 20%, 30% or 40% by weight. Alternative upper limits of the VLDPE polymer can be 95%, 90%, 80%, 70%, and 60% by weight. Ranges from any lower limit to any upper limit are within the scope of the invention. Preferred blends include from 5 to 85%, alternatively from 10–50% or from 10–30% by weight of the VLDPE polymer. The balance of the weight percentage is the weight of the LDPE polymer component.

In one preferred embodiment, the polymer blend includes a metallocene-catalyzed VLDPE polymer having a density of less than 0.916 g/cm$^3$, and an LDPE polymer having a density of from 0.916 to 0.940 g/cm$^3$.

In another preferred embodiment, the polymer blend includes a gas-phase metallocene-produced VLDPE polymer, the VLDPE polymer being a copolymer of ethylene and at least one $C_3$ to $C_{12}$ alpha olefin and having a density of from 0.900 to 0.915 g/cm$^3$ and a melt index of from 0.5 to 20 g/10 min; and a metallocene-produced LDPE polymer, the LDPE polymer being a copolymer of ethylene and at least one $C_3$ to $C_{12}$ alpha olefin and having a density of from 0.916 to 0.925 g/cm$^3$ and a melt index of from 0.5 to 20 g/10 min, wherein the blend includes 5–85% by weight of the VLDPE polymer and 95–15% by weight of the LDPE polymer, preferably 10–50% by weight of the VLDPE polymer and 90–50% by weight of the LDPE polymer, based on the total weight of the VLDPE and LDPE polymers.

In any of these embodiments, the VLDPE polymer, the LDPE polymer, or both, can be blends of such polymers. I.e., the VLDPE polymer component of the blend can itself be a blend of two or more VLDPE polymers having the characteristics described herein, and alternatively or additionally, the LDPE polymer component of the blend can itself be a blend of two or more LDPE polymers having the characteristics described herein.

4.4 Films, Coatings, and Articles

Films of the metallocene VLDPE polymers of the present invention can be formed by conventional processes, preferably by a chill roll casting process. The polymer is extruded by an extruder, melt processed through a slot die, and melt drawn down by an optional air knife and chill roll. Extrusion coating are generally processed at higher temperatures than cast films, typically about 600° F., in order to promote adhesion of the extruded material to the substrate. The resulting polymer film is collected on a winder. The film thickness can be monitored by a gauge monitor, and the film can be edge trimmed by a trimmer. One or more optional treaters can be used to surface treat the film, if desired. Such chill roll casting processes and apparatus are well known in the art, and are described, for example, in The Wiley Encyclopedia of Packaging Technology, Second Edition, A. L. Brody and K. S. Marsh, Ed., John Wiley and Sons, Inc., New York (1997). Other extrusion coating processes are known in the art, and are described, for example, in U.S. Pat. Nos. 5,268,230, 5,178,960 and 5,387,630.

In one embodiment, the present invention is directed to metallocene VLDPE films or coatings of the films on flexible media such as paper, metal foil, polymeric materials such as polypropylene, polyester, and the like. The film resins have a density less than 0.916 g/cm$^3$, and a melt flow ratio ("MFR") of from 6–15 dg/min, preferably of from 9–12 dg/min. In general, the density of the film resin is from 0.890 to 0.915 g/cm$^3$, from 0.905 to 0.915 g/cm$^3$, from 0.910 to 0.915 g/cm$^3$, or from 0.911 to 0.913 g/cm$^3$. In a particular embodiment, the film resin has a density of 0.912 g/cm$^3$ and an MFR of 12 dg/min. These films and coatings can be produced as described above.

It should be emphasized that the VLDPE/LDPE blends of the present invention can make use of VLDPE polymers produced by the methods described herein, or VLDPE polymers produced by other methods known in the art for use in making metallocene VLDPE polymers.

In another embodiment, the present invention is directed to metallocene VLDPE films or coatings of the films on flexible media such as paper, metal foil and the like, wherein the film or coating is formed of a resin including a metallocene VLDPE blended with an LDPE. The substrate can also be stock for milk cartons, juice containers, films, etc. The amount of LDPE in the blend can be from 1 to 40% by weight, preferably from 5 to 35%, from 10 to 30%, or from 15 to 25% by weight. In a particular embodiment, the resin blend includes 20% by weight of an LDPE such as LD200 or LD270, which are commercially available LDPE resins. The resin blends and/or the mVLDPE in the blends, have a density less than 0.916 g/cm$^3$, and a melt flow ratio ("MFR") of from 6–15 dg/min, preferably of from 9–12 dg/min. These films and coatings can be produced as described above. The LDPE and mVLDPE can be blended in conventional processes well known in the art.

The films and coatings of the present invention are also suitable for use in laminate structures; i.e., with a film or a coating as described herein disposed between two substrates. These films and coatings are also suitable for use as heat sealing or moisture barrier layers in single- or multilayer structures.

Another aspect of the invention relates to the formation of monolayer films from the polymer blend compositions discussed above. These films may be formed by any number of well known extrusion or coextrusion techniques discussed below. Films of the invention may be unoriented, uniaxially oriented or biaxially oriented. Physical properties of the film may vary depending on the film forming techniques used.

Another aspect of the invention relates to the formation of multilayer films from the polymer blend compositions discussed above. Multiple-layer films may be formed by methods well known in the art. The total thickness of multilayer films may vary based upon the application desired. A total film thickness of about 5–100 μm, more typically about 10–50 μm, is suitable for most applications. Those skilled in the art will appreciate that the thickness of individual layers for multilayer films may be adjusted based on desired end use performance, resin or copolymer employed, equipment capability and other factors. The materials forming each layer may be coextruded through a coextrusion feedblock and die assembly to yield a film with two or more layers adhered together but differing in composition. Coextrusion can be adapted for use in both cast film or blown film processes.

When used in multilayer films, the VLDPE/LDPE polymer blend may be used in any layer of the film, or in more than one layer of the film, as desired. When more than one layer of the film is formed of a VLDPE/LDPE polymer blend of the present invention, each such layer can be individually formulated; i.e., the layers formed of the VLDPE/LDPE polymer blend can be the same or different chemical composition, density, melt index, thickness, etc., depending upon the desired properties of the film.

To facilitate discussion of different film structures of the invention, the following notation is used herein. Each layer of a film is denoted "A" or "B", where "A" indicates a conventional film layer as defined below, and "B" indicates a film layer formed of any of the VLDPE polymers of the present invention. Where a film includes more than one A layer or more than one B layer, one or more prime symbols (', ", ''', etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of a VLDPE/LDPE polymer blend of the invention disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the relative thickness of an A/B/A' film having A and A' layers of 10 μm each and a B layer of 30 μm is denoted as 20/60/20.

For the various films described herein, the "A" layer can be formed of any material known in the art for use in multilayer films or in film-coated products. Thus, for example, the A layer can be formed of a polyethylene homopolymer or copolymer, and the polyethylene can be, for example, a VLDPE, a low density polyethylene (LDPE), an LLDPE, a medium density polyethylene (MDPE), or a high density polyethylene (HDPE), as well as other polyethylenes known in the art. The polyethylene can be produced by any suitable process, including metallocene-catalyzed processes and Ziegler-Natta catalyzed processes. Further, the A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Co., and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, other polyethylenes, such as HDPE, LDPE, LMDPE, and MDPE, and paper.

The "B" layer is formed of a VLDPE/LDPE polymer blend of the invention, and can be any of such blends described herein. In one embodiment, the B layer is formed of a blend of a metallocene-catalyzed VLDPE polymer having a density of less than 0.916 g/cm$^3$ and a LDPE polymer having a density of from 0.916 to 0.940 g/cm$^3$. In another embodiment, the B layer is formed of a blend comprising: (a) a gas-phase metallocene-produced VLDPE copolymer of ethylene and at least one $C_3$ to $C_{12}$ alpha olefin and having a density of from 0.900 to 0.915 g/cm$^3$ and a melt index of from 0.5 to 10 g/10 min; and (b) a LDPE homopolymer or copolymer having a density of from 0.916 to 0.940 g/cm$^3$ and a melt index of from 0.5 to 20 g/10 min. In one embodiment, the B layer is formed of a blend comprising a gas-phase metallocene-produced VLDPE having a melt index having the lower limits of 0.5 g/10 min or more, 0.7 g/10 min or more, 1 g/10 min or more and having the upper limits of 5 g/10 min or less, 3 g/10 min or less, or 2 g/10 min or less, with melt index ranges from any lower limit to any upper limit being within the scope of the invention. In one preferred embodiment, the B layer is formed of a blend as described herein, wherein the VLDPE component of the blend has one or more of the following characteristics, in addition to the density, melt index, and other parameters described herein:

(a) a composition distribution CDBI of 50 to 85%, alternatively 60 to 80%, or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

The thickness of each layer of the film, and of the overall film, is not particularly limited, but is determined according to the desired properties of the film. Typical film layers have a thickness of about 1 to 1000 μm, more typically about 5 to 100 μm, and typical films have an overall thickness of 10 to 100 μm.

In one embodiment, the present invention provides a single-layer (monolayer) film formed of any of the VLDPE/LDPE polymer blends of the invention; i.e., a film having a single layer which is a B layer as described above.

In other embodiments, and using the nomenclature described above, the present invention provides multilayer films with any of the following exemplary structures:

(a) two-layer films, such as A/B and B/B';

(b) three-layer films, such as A/B/A', A/A'/B, B/A/B' and B/B'/B'';

(c) four-layer films, such as A/A'/A''/B, A/A'/B/A'', A/A'/B/B', A/B/A'/B', A/B/B'/A', B/A/A'/B', A/B/B'/B'', B/A/B'/B'' and B/B'/B''/B''';

(d) five-layer films, such as A/A'/A''/A'''/B, A/A'/A''/B/A''', A/A'/B/A''/A''', A/A'/A''/B/B', A/A'/B/A''/B', A/A'/B/B'/A'', A/B/A'/B'/A'', A/B/A'/A''/B, B/A/A'/A''/B', A/A'/B/B'/B'', A/B/A'/B'/B'', A/B/B'/B''/A', B/A/A'/B'/B'', B/A/B'/A'/B'', B/A/B'/B''/A', A/B/B'/B''/B''', B/A/B'/B''/B''', B/B'/A/B''/B''', and B/B'/B''/B'''/B'''';

and similar structures for films having six, seven, eight, nine or more layers. It should be appreciated that films having still more layers can be formed using the VLDPE/LDPE polymer blends of the invention, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focussed on multilayer films, the films of the VLDPE/LDPE polymer blends of the present invention can also be used in as coatings; e.g., films formed of the inventive polymers, or multilayer films including one or more layers formed of the inventive polymers, can be coated onto a substrate such as paper, metal, glass, plastic and other materials capable of accepting a coating. Such coated structures are also within the scope of the present invention.

As described below, the films can be cast films or blown films. The films can further be embossed, or produced or processed according to other known film processes. The films can be tailored to specific applications by adjusting the thickness, materials and order of the various layers, as well as the additives in each layer.

In one aspect, films containing the polymer blend composition, monolayer or multilayer, may be formed by using casting techniques, such as a chill roll casting process. For example, a composition can be extruded in a molten state through a flat die and then cooled to form a film. As a specific example, cast films can be prepared using a pilot scale commercial cast film line machine as follows. Pellets of the polymer are melted at a temperature ranging from about 250° C. to about 300° C., with the specific melt temperature being chosen to match the melt viscosity of the particular resins. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box or air knife can be used to pin the melt exiting the die opening to a primary chill roll maintained at about 90° F. (32 C). The resulting polymer film is collected on a winder. The film thickness can be monitored by a gauge monitor, and the film can be edge trimmed by a trimmer. One or more optional treaters can be used to surface treat the film, if desired. Such chill roll casting processes and apparatus are well known in the art, and are described, for example, in The Wiley-Encyclopedia of Packaging Technology, Second Edition, A. L. Brody and K. S. Marsh, Ed., John Wiley and Sons, Inc., New York (1997). Although chill roll casting is one example, other forms of casting can be used.

In another aspect, films containing the polymer blend composition, monolayer or multilayer, may be formed using blown techniques, i.e. to form a blown film. For example, the composition can be extruded in a molten state through an annular die and then blown and cooled to form a tubular, blown film, which can then be axially slit and unfolded to form a flat film. As a specific example, blown films can be prepared as follows. The polymer blend composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing of printing. The finished film can be wound into rolls for later processing, or can be fed into a bag machine and converted into bags. A particular blown film process and apparatus suitable for forming films according to embodiments of the present invention is described in U.S. Pat. No. 5,569,693. Of course, other blown film forming methods can also be used.

In another aspect, the invention relates to any polymer product containing the polymer blend composition produced by methods known in the art. In addition, this invention also includes products having other specific end-uses, such as film-based products, which include stretch films, bags (i.e. shipping sacks, trash bags and liners, industrial liners, and produce bags), flexible and food packaging (e.g., fresh cut produce packaging, frozen food packaging), personal care films pouches, medical film products (such as IV bags), diaper backsheets and housewrap. Products may also include packaging as bundling, packaging and unitizing a variety of products including various foodstuffs, rolls of carpet, liquid containers and various like goods normally containerized and/or palletized for shipping, storage, and/or display. Products may also include surface protection applications, with or without stretching, such as in the temporary protection of surfaces during manufacturing, transportation, etc. There are many potential applications of articles and films produced from the polymer blend compositions described herein.

Alternatively, or additionally, the mVLDPE can be blended with LLDPE, EVA, EMA, either in addition to, or instead of, the LDPE, if desired, in the blends, films, and article described herein.

The advantageous properties described above, as well as others that one skilled in the art will appreciate from the present disclosure, are illustrated herein in the following examples.

5. EXAMPLES

Materials and Methods

Metallocene catalysts for the polymerization of the inventive VLDPE were prepared according to the methods as described above for an unbridged bis-Cp structure (such as a_bis(1,3-methyl-n-butyl cyclopentadienyl) zirconium dichloride).

In certain examples, various properties of the polymers were measured according to the following test procedures, and it is understood that whenever these properties are discussed in this specification and in the claims, such properties are to be measured in accordance with these procedures.

Tensile strength values were measured (machine direction ("MD") and transverse direction ("TD")) in accordance with ASTM D882-95A, except that film gauge was measured using ASTM D374-94 Method C, except that the micrometer calibration was performed annually with a commercially available gauge block (Starret Webber 9, JCV1&2). As reflected in Table IV, tensile values were measured at yield MD and TD, 200% MD and TD and Ultimate Tensile MD and TD.

The ACD protocol is an analytical-scale TREF (Temperature Rising Elution Fractionation) test for semicrystalline copolymers to characterize the composition distribution (CD). A sample is dissolved in a good solvent, cooled slowly to allow crystallization on a support, and then re-dissolved and washed from the support by heating during elution. Polymer chains are fractionated by differences in their crystallization temperature in solution, which is a function of composition (and defect structure). A mass detector provides concentration vs. elution temperature data; CD characterization is obtained by applying a calibration curve (i.e., mole % comonomer vs. temperature) established using narrow-CD standards. Two in-house Visual Basic programs are used for data acquisition and analysis.

There are really two distributions provided by the ACD test:

Solubility Distribution (weight fraction vs. solubility temperature)—measured directly.

Composition Distribution (weight fraction vs. comonomer content)—obtained by applying the calibration curve to the solubility distribution.

Emphasis is usually placed on characterization of the CD. However, the solubility distribution can be of equal or greater importance when:

A calibration curve has not been established for the polymer of interest.

The MW of the sample is low, or the MWD is broad enough that a significant portion of the sample is low MW (M<20 k). Under these circumstances, the reported CD is influenced by the MW-dependence of solubility. The calibration curve must be corrected for the effect of MW to give the true CD, which requires a priori knowledge of the relative influence of MW and composition on solubility for a given sample. In contrast, the solubility distribution correctly accounts for contributions from both effects, without trying to separate them.

Note that the solubility distribution should depend on solvent type and crystallization/dissolution conditions. If correctly calibrated, the CD should be independent of changes in these experimental parameters.

Composition Distribution Breadth Index (CDBI) was measured using the following instrumentation: ACD: Modified Waters 150-C for TREF (Temperature Rising Elution Fractionation) analysis (includes crystallization column, by-pass plumbing, timing and temperature controllers); Column: 75 micron glass bead packing in (High Pressure Liquid Chromotography) HPLC-type column; Coolant: Liquid Nitrogen; Software: "A-TREF" Visual Basic programs; and Detector: Polymer Laboratories ELS-1000. Run conditions for the CDBI measurements were as follows:

GPC Settings

| | |
|---|---|
| Mobile phase: | TCE (tetrachlororethylene) |
| Temperature: | column compartment cycles 5–115° C., injector compartment at 115° C. |
| Run time: | 1 hr 30 min |
| Equilibration time: | 10 min (before each run) |
| Flow rate: | 2.5 mL/min |
| Injection volume: | 300 µL |
| Pressure settings: | transducer adjusted to 0 when no flow, high pressure cut-off set to 30 bar |

Temperature Controller Settings

| | | | |
|---|---|---|---|
| Initial Temperature: | 115° C. | | |
| Ramp 1 Temperature: | 5° C. | Ramp time = 45 min | Dwell time = 3 min |
| Ramp 2 Temperature: | 115° C. | Ramp time = 30 min | Dwell time = 0 min |

Alternative temperature controller settings if two peaks are not exhibited in a TREF measurement.

| Initial Temperature: | 115° C. | | |
|---|---|---|---|
| Ramp 1 Temperature: | 5° C. | Ramp time = 12 hrs | Dwell time = 3 min |
| Ramp 2 Temperature: | 115° C. | Ramp time = 12 hrs | Dwell time = 0 min |

In some case, longer ramp times may be needed to show two peaks in a TREF measurement.

ELS Settings

| Nebulizer temperature: | 120° C. |
|---|---|
| Evaporator temperature: | 135° C. |
| Gas flow rate: | 1.0 slm (standard liters per minute) |
| Heated transfer line temperature: | 120° C. |

Melt Index was determined according to ASTM D-1238-95. Melt index is reported in units of g/10 min, or the numerically equivalent units of dg/min.

Density (g/cm$^3$) was determined using chips cut from plaques compression molded in accordance with ASTM D-1928-96 Procedure C, aged in accordance with ASTM D618 Procedure A, and measured according to ASTM D1505-96.

In measuring the 1% Secant, the procedures in ASTM D882-95A were followed, except that the film gauge was measured according to ASTM D374-94 Method C, except that the micrometer calibration was performed annually with a commercially available gauge block (Starret Webber 9, JCV1&2).

In measuring Elmendorf Tear, the procedures in ASTM D1922-94a were used, except that the film gauge was measured according to ASTM D374-94 Method C, except that the micrometer calibration was performed annually with a commercially available gauge block (Starret Webber 9, JCV1&2).

Dart Drop values were measured using the procedures in ASTM D1709-98 Method A, except that the film gauge was measured according to ASTM D374-94 Method C, except that the micrometer calibration was performed annually with a commercially available gauge block (Starret Webber 9, JCV1&2).

Haze was measured in accordance with ASTM D1003-95.

Gloss was measured in accordance with ASTM D2457-90.

Total Energy was measured in accordance with ASTM D4272-90.

The test used to measure "puncture" values simulates the poking of a finger or bottle through a plastic film, and is a recognized method of testing garbage bags. The testing procedure is available from United Testing Machines, and is denoted PLFL-201.01. Generally, the test measures the force and energy necessary to puncture a plastic film with a gauge of 0.20–10.0 mils (50 to 250 μm). For puncture measurements, a film sample is placed in a clamp approximately 4 inches (10 cm) wide. A plunger with a ¾" tip (19 mm) is plunged through it at a constant speed of 10 in/min (25 cm/min). A United Testing Machine SFM-1 is used, and is calibrated annually by the manufacturer. Before testing, samples are conditioned at 23° C. and 50% relative humidity for at least 40 hours following fabrication. The sample is cut across the transverse direction (TD) bubble 6" (15 cm) side and in the case for blown film separated. Prior to testing, each sample is gauged, with the average thickness recorded in mils, taken from the gauge micrometer data sheet. The average gauge of the sample area is used in the test results calculations. The average peakload and break energy values of 5 specimens are used to compile the final test results for each sample.

Polydispersity or molecular weight index (Mw/Mn) is calculated based on the ratio of weight average molecular weight (Mw) and number average molecular weight (Mn) by size exclusion chromatography.

Hot tack strength was measured in accordance with the following procedure. The hot tack samples were 15 mm wide specimens cut from original films. The samples were back-taped (laminated) with PET to avoid rupture at the transition of the seal and elongation or sticking to the seal bars. A Hot Tack Tester 3000, from J&B, was employed to make the seal, using a seal bar pressure of 0.5 MPa, and a seal time of 0.5 s. The hot tack strength was then determined, after a cooling time of 0.4 s and at a peel speed of 200 mm/min. Gauge: film gauge was measured according to ASTM D374-94 Method C, except that the micrometer calibration was performed annually with a commercially available gauge block (Starret Webber 9, JCV1&2).

Shrink (%) was determined in the machine direction (MD) and transverse direction (TD) as follows. A 100 mm circle is cut from the film. The machine direction is marked, then the specimen is talced and then heated. The amount of shrinkage is measured in both MD and TD, and is reported as % MD shrinkage and % TD shrinkage.

For measurements of film properties, the film samples were annealed by heating for 48 hours at 140° F. (60° C.) prior to testing.

EXAMPLE 1

A commercial scale gas phase reactor system was operated under condensed mode conditions over a 24-hour period. Table I summarizes the reaction conditions for this 24-hour period. The measured densities of the polyethylene polymers produced over that period ranged from 0.9090 to 0.9124 g/cm$^3$.

TABLE I

| | LOW | HIGH | AVG |
|---|---|---|---|
| Reaction Rate (klbs/hr) | 8.8 | 11.5 | 9.9 |
| (kg/hr) | 4.0 × 10$^3$ | 5.22 × 10$^3$ | 4.5 × 10$^3$ |
| Total Catalyst Feed (lbs/hr) | 0.95 | 1.73 | 1.27 |
| (kg/hr) | 0.43 | 0.785 | 0.576 |
| Reactor Temperature (° C.) | 78.8 | 80.0 | 80.3 |
| Reactor Pressure (psig) | 252 | 268 | 259 |
| (MPa) | 1.74 | 1.84 | 1.79 |
| Ethylene Feed (lbs/hr) | 8375 | 10586 | 9156 |
| (kg/hr) | 3799 | 4802 | 4153 |
| Hexene Feed (lbs/hr) | 851 | 1243 | 1052 |
| (kg/hr) | 386 | 564 | 477 |
| Hydrogen Feed (lbs/hr) | 0.1423 | 0.2546 | 0.1963 |
| (g/hr) | 64.55 | 115.5 | 89.04 |
| C$_6$/C$_2$ Mole Ratio | 0.239 | 0.0249 | 0.0250 |
| C$_2$/H$_4$ Partial Pressure | 168 | 182 | 172 |
| C$_6$/C$_2$ Flow Ratio | 0.0958 | 0.1261 | 0.1146 |
| Superficial Velocity (ft/s) | 2.00 | 2.09 | 2.05 |
| (cm/s) | 61.0 | 63.7 | 62.5 |
| Bed Level (ft) | 35.6 | 39.6 | 37.5 |
| (m) | 10.9 | 12.1 | 11.4 |
| Mid Bed Density | 34.0 | 39.1 | 37.4 |
| Distributor Plate DP (psi) | 2.56 | 9.6 | 7.67 |
| (kPa) | 17.7 | 66 | 52.9 |
| Cycle Gas Cooler DP (psi) | 8.9 | 12.6 | 10.4 |

TABLE I-continued

|  | LOW | HIGH | AVG |
|---|---|---|---|
| (kPa) | 61 | 86.9 | 71.7 |
| Catalyst Feeder Speed (rpm) | 388 | 519 | 434 |

EXAMPLE 2

A different gas phase reactor system from the system in Example 1 was operated to produce VLDPEs of this invention. Table II summarizes reaction conditions for two different runs, as well as properties of the resulting polymers. As reflected in Table II, the densities of the polymers were 0.9118 and 0.9121 g/cm$^3$.

TABLE II

|  | Run 1 | Run 2 |
|---|---|---|
| QC Lab Data |  |  |
| MI (g/10 min) | 1.02 | 1.03 |
| MIR (HLMI/MI) | 16.69 | 17.13 |
| Density (g/cm$^3$) | 0.9118 | 0.9121 |
| Bulk Density (g/cm$^3$) | 0.4500 | 0.4494 |
| APS (μm) | 997 | 921 |
| COV (%) | 38.8 | 38.2 |
| PSD < 250 μ (%) | 1.073 | 1.232 |
| PSD < 125 μ (%) | 0.267 | 0.175 |
| Pan (%) | 0.042 | 0.027 |
| Fines (<125 μm) (%) | 0.267 | 0.175 |
| Flow Time (s) | 7.93 | 7.81 |
| MCL Data |  |  |
| Ash (ppm) | 144 | 137 |
| Zr by ICPES (ppm) | 0.5163 | 0.5187 |
| Al by ICPES (ppm) | 15.5 | 14.9 |
| Process Data |  |  |
| Prod Rate (klbs/hr) | 154 | 172 |
| (kg/hr) | 6.99 × 10$^4$ | 7.81 × 10$^4$ |
| Hydrogen (ppm) | 149 | 153 |
| Ethylene (mol %) | 70.1 | 70.0 |
| Hexene (mol %) | 1.70 | 1.73 |
| Butene (mol %) | 0.00 | 0.00 |
| C$_2$ PP (psia) | 220.4 | 220.2 |
| (MPa) | 1.520 | 1.518 |
| H$_2$/C$_2$ Concentration Ratio | 2.13 | 2.19 |
| H$_2$/C$_2$ Flow Ratio | 0.017 | 0.021 |
| C$_6$/C$_2$ Concentration Ratio | 0.243 | 0.247 |
| C$_6$/C$_2$ Flow Ratio | 0.119 | 0.115 |
| C$_4$/C$_2$ Concentration Ratio | 0.0000 | 0.0000 |
| C$_4$/C$_2$ Flow Ratio | 0.000 | 0.000 |
| Temperature (° F.) | 175.0 | 175.0 |
| (° C.) | 79.4 | 79.4 |
| Bed Weight (lbs) | 593 | 594 |
| (kg) | 269 | 269 |
| Res Time (hrs) | 3.88 | 3.45 |
| Gas Velocity (ft/s) | 2.25 | 2.25 |
| (cm/s) | 68.6 | 68.6 |
| Plate dP ("H$_2$O) | 26.5 | 26.2 |
| (cm H$_2$O) | 67.3 | 66.5 |
| Cooler dP (psig) | 0.78 | 0.78 |
| (kPa) | 5.4 | 5.4 |
| RX Pressure (psig) | 299.6 | 299.6 |
| (MPa) | 2.066 | 2.066 |
| C$_2$ Feed (lb/hr) | 193.7 | 211.9 |
| (kg/hr) | 87.86 | 96.12 |

EXAMPLE 2a

Table IIA is one example of the reactor conditions to produce one embodiment of a m-VLDPE of the present invention having a melt index of 12.28 dg/min.

TABLE IIA

| Reactor Process Data |  | Grade | ECD-330 |
|---|---|---|---|
| Number of Hourly Data Points |  |  | 10 |
| PMX Database Tag and Name |  |  |  |
| Production Rate | R1C218 | Klbs/hr | 77.2 |
| Catalyst Rate | R1Q218 | lbs/hr | 9.6 |
| Cat Productivity | RPM Calc | lb/lb | 8447 |
| Rx Temperature | R1C163 | oF | 176.0 |
| Rx Pressure | R1P177 | psig | 304.1 |
| Inlet Temperature | R1T166 | oF | 95.6 |
| Dew Point-Inlet | R1TDELTA | oF | 50.7 |
| % Condensed | R1WTPCT | wt % | 9.9 |
| Superficial Velocity | R1C944 | ft/sec | 2.49 |
| Bed Weight | R1W176 | Klbs | 140.2 |
| Bed Height | R1D174 | ft | 48.5 |
| Ethylene Part Pres | R1P486 | psia | 186.9 |
| Ethylene Conc | R1V486 | mole % | 58.64 |
| Hexene Conc | R1V482 | mole % | 1.65 |
| H2 Conc | R1A881B | ppm | 509 |
| Isopentane Conc | R1V48A | mole % | 7.19 |
| Nitrogen Conc | R1V483 | mole % | 31.80 |
| H2/C2= | R1H2C2E | ppm/mol | 8.67 |
| C6=/C2= | R1Q489 | mol/mol | 2.81 |
| Ethylene Flow | R1B100 | Klbs/hr | 67.0 |
| Hexene Flow | R1B104 | Klbs/hr | 9.73 |
| Hydrogen Flow | R1B107 | lbs/hr | 6.16 |
| Isopentane Flow | R1F317 | Klbs/hr | 225 |
| C6=/C2= Flow Ratio | R1R104 | lb/lb | 0.160 |
| H2/C2= Flow Ratio | R1R107 | lb/Klb | 0.092 |
| Rx1 Bed FBD/ SBD | R1D175 | Ratio | 0.78 |
| Rx1 Lower FBD | R1P171 | lb/ft3 | 18.9 |
| Rx1 Upper FBD | R1P172 | lb/ft3 | 17.4 |
| Rx1 Avg Filter FBD | R1C171 | lb/ft3 | 17.9 |
| Rx1 Cat Pct Activity | R1Q587 | Pct | 59 |
| Rx1 IPDS Drop/hr | R1C174SP | Drop/Hr | 24.2 |
| Rx1 Bed Res. Time | R1C176 | Hours | 1.86 |
| Screw Recov. Flow | 05C306 | klb/hr | 5.01 |
| Sulzer Recov. Flow | R1F419 | lb/hr | 551 |
| Rx1 N2 Purger Wt | 05W461 | klbs | 145.7 |
| Rx1 Stm Purger Wt | 05W487 | klbs | 27.3 |
| Calc FBD w/Wt&Ht | Calc | lb/ft3 | 17.5 |
| Calc FBD/SBD | Calc | Ratio | 0.76 |
| Space Time Yield | STY | lb/hr/ft3 | 9.6 |
| Residence Time | Calc | hr-1 | 1.86 |
| Auburn Cat Prod | R1Q588 | klb/lb | 7.23 |
| Rx1 Flare Vent | R1F134 | klb/hr | 0.000 |
| Rx1 Vent to Purger | R1F180 | klb/hr | 0.000 |
| Rx1 Composite Vent | R1B135 | klb/hr | 0.000 |
| Lab Data |  |  |  |
| Melt Index | 35LR101 | dg/min | 12.28 |
| Gradient Density | 35LR102 | g/cc | 0.9107 |
| Bulk Density | 35LR104 | lb/ft3 | 23.0 |
| APS | 35LR107 | inches | 0.043 |
| Fines (<120 mesh) | 35LR110 | wt % | 0.04 |
| Ash | 35LR105 | ppm | 105 |
| Normal Cat Prod |  | lb/lb | 7488 |
| (for 175 psia C2=) |  |  |  |
| at C2PP 1.83. |  |  |  |
| Bed Weight | FBD * BedHt |  | 143530 |
| ResTime | Bed Wt/ProdRate |  | 1.86 |

EXAMPLE 3

Certain VLDPE polymers of the invention were prepared using the gas phase polymerization using metallocene catalyst systems as described herein. Films were formed from these polymers. The invention films are identified below as Samples A and G. Sample A was made in the reactor system of Example 1, and Sample G was made in the reactor system of Example 2. The co-monomers used to make Samples A and G were ethylene and hexene. Fluidized gas phase reactors were operated to produce the resulting copolymers.

The polymerizations were conducted in the continuous gas phase fluidized bed reactors described in Examples 1 and 2. The fluidized beds of those reactors were made up of polymer granules. The gaseous feed streams of ethylene and hydrogen were introduced below each reactor bed into the recycle gas line. Hexene comonomer was introduced below the reactor bed. An inert hydrocarbon (isopentane) was also introduced to each reactor in the recycle gas line, to provide additional heat capacity to the reactor recycle gases. The individual flow rates of ethylene, hydrogen and hexene comonomer were controlled to maintain fixed composition targets. The concentrations of the gases were measured by an on-line gas chromatograph to ensure relatively constant composition in the recycle gas stream.

The solid catalyst was injected directly into the fluidized beds using purified nitrogen. The catalyst injection rates were adjusted to maintain a constant production rate. The reacting beds of growing polymer particles were maintained in a fluidized state by a continuous flow of the make up feed and recycle gas through each reaction zone. To maintain constant reactor temperatures, the temperature of the recycle gas was continuously adjusted up or down to accommodate any changes in the rate of heat generation due to the polymerization.

The fluidized bed was maintained at a constant height by withdrawing a portion of the bed at a rate equal to the formation of the particulate product. The product was transferred to a purger vessel to remove entrained hydrocarbons.

EXAMPLE 4

For purposes of demonstrating the surprisingly improved toughness of the VLDPEs of this invention, a variety of films made of polyethylene polymers made using different processes were compared. Specifically, the properties of certain invention polymers, i.e., those made in accordance with the gas polymerization processes corresponding to the invention, using metallocene catalysts, were compared with certain comparative polymers, i.e., polymers made in accordance with non-invention methods. Referring now to the comparative examples, Sample B was made using a comparative polymer, specifically, a linear low density polyethylene (0.9189 $g/cm^3$) made using metallocene catalyst in a gas phase polymerization process. Sample C was made using a linear low density polyethylene (0.9199 $g/cm^3$) made using Ziegler-Natta catalyst in a gas phase polymerization process. Sample D was made using a plastomer (0.9031 $g/cm^3$) made using metallocene catalyst in a high pressure bulk polymerization process. Sample E was made using a very low density polyethylene (0.9132 $g/cm^3$) made using Ziegler-Natta catalyst in a solution polymerization process. Sample F was made using a very low density polyethylene (0.9104 $g/cm^3$) made using metallocene catalyst in a solution polymerization process.

Each of the polymers was formed into a film. The processing conditions for the preparation of the films reported in Table V are set forth in Table III below. The properties of each of the films were then measured. The properties of the films reported in Table V are set forth in Table IV.

TABLE III

| Measured Properties | A | B | C | D | E | F | G |
|---|---|---|---|---|---|---|---|
| Melt Temperature | | | | | | | |
| (° F.) | 385 | 388 | 377 | 397 | 381 | 377 | 392 |
| (° C.) | 196 | 198 | 192 | 203 | 194 | 192 | 200 |
| Extruder Head Press | | | | | | | |
| (psi) | 3520 | 3490 | 3120 | 4490 | 3220 | 3190 | 3780 |
| (MPa) | 24.3 | 24.1 | 21.5 | 31.0 | 22.2 | 22.0 | 26.1 |
| Extruder Speed (rpm) | 46.4 | 46.4 | 46.4 | 41.8 | 46.6 | 43.3 | 45.4 |
| Line Speed | | | | | | | |
| (ft/min) | 123 | 121 | 119 | 119 | 119 | 119 | 119 |
| (m/min) | 3.75 | 3.67 | 3.63 | 3.63 | 3.63 | 3.63 | 3.63 |
| Production Rate | | | | | | | |
| (lbs/hr) | 155 | 152 | 152 | 154 | 151 | 152 | 153 |
| (kg/hr) | 70.3 | 68.9 | 68.9 | 69.9 | 68.5 | 68.9 | 69.4 |
| Frost Line Height | | | | | | | |
| (in) | 20 | 18 | 15 | 25 | 16 | 18 | 19 |
| (cm) | 51 | 46 | 38 | 63 | 41 | 46 | 48 |
| Extruder Drive Load (%) | 55.4 | 55.7 | 49.1 | 59.6 | 47.5 | 47.6 | 56.6 |
| Motor Load/Prod. Rate | 0.357 | 0.366 | 0.323 | 0.387 | 0.315 | 0.313 | 0.37 |
| Horsepower | 13.6 | 13.7 | 12 | 13.2 | 11.7 | 10.9 | 13.6 |
| Prod. Rate/Horsepower | 11.38 | 11.11 | 12.63 | 11.67 | 12.86 | 13.93 | 11.21 |
| Torque (hp · rpm) | 0.293 | 0.295 | 0.26 | 0.316 | 0.251 | 0.252 | 0.3 |

TABLE IV

| Measured Properties | A | B | C | D | E | F | G |
|---|---|---|---|---|---|---|---|
| Density (g/cm³) | | | | | | | |
| Molded | 0.9129 | 0.9189 | 0.9199 | 0.9031 | 0.9132 | 0.9104 | 0.9114 |
| Rheology | | | | | | | |
| MI (I2) | 1.07 | 1.17 | 1.10 | 1.09 | 1.00 | 0.96 | 0.97 |
| HLMI (I21) | 18.50 | 19.14 | 30.03 | 18.03 | 30.37 | 35.54 | 17.04 |
| Ratio (I21/I2) | 17.29 | 16.36 | 27.30 | 16.54 | 30.37 | 37.02 | 17.56 |
| MI Swell | 1.12 | 1.08 | 1.17 | 1.01 | 1.14 | 1.23 | 1.10 |
| Hexene Content | | | | | | | |
| Wt % | 9.6 | 7.1 | | | | | 10.2 |
| GPC-HT | | | | | | | |
| Mn | 50612 | 48653 | | | | | 52016 |
| Mw | 100908 | 100064 | | | | | 102647 |
| Mw/Mn | 1.99 | 2.06 | | | | | 1.97 |
| Mz/Mw | 1.66 | 1.69 | | | | | 1.61 |
| Mz + 1/Mw | 2.46 | 2.52 | | | | | 2.29 |
| ACD | | | | | | | |
| CDBI | 64.5 | 6.7 | | | | | 55.3 |
| % Solubles | 0.6 | 0.6 | | | | | 1.1 |
| DSC (° C.) | | | | | | | |
| 1$^{st}$ melt-Peak | | | | | | | |
| 2$^{nd}$ peak | | | | | | | |
| 3$^{rd}$ peak | | | | | | | |
| 2$^{nd}$ melt-Peak | 118.34 | 120.70 | 124.56 | | 118.00 | 105.68 | 117.83 |
| 2$^{nd}$ peak | 103.41 | 109.62 | | 99.64 | 123.25 | | 101.72 |
| 3$^{rd}$ peak | | | | | 103.62 | | |
| ΔH (J/g) | 112.06 | 126.96 | 128.45 | 94.76 | 112.45 | 108.61 | 109.84 |
| Crystallization-Peak | | | | | | | |
| 2$^{nd}$ peak | | | | | | | |
| 3$^{rd}$ peak | | | | | | | |
| Tear-Intrinsic (g/mil) | 346 | 351 | 460 | 237 | 546 | 433 | 327 |

The films made of invention polymers (Samples A and G) were tested in accordance with the test procedures discussed above. The same properties of the comparative films, made of polymers made using non-invention processes, were also measured, to demonstrate certain improved properties resulting from the invention. The results of these measurements are shown in Table V.

The films made of invention polymers showed a remarkable improvement over comparative polymers in Dart Drop values, which measure the energy that causes a polymer film to fail under specified conditions of impact of a free-falling dart. As reflected in Table V, Dart Drop values for Samples A and G were 623 and 1,289 g/mil, respectively. These Dart Drop values were over 50% greater than the Dart Drop values for all the films made of polymers made using solution polymerization processes. That is, Dart Drop for Sample E (a film made of a VLDPE made using Ziegler-Natta catalyst in a solution polymerization process) was 338 g/mil, and Dart Drop for Sample F (a film made of a VLDPE made using metallocene catalyst in a solution polymerization process) was 491 g/mil. The Dart Drop values of the films made of invention polymers were also over 50% greater than the Dart Drop values for films made of polymers made using other gas phase polymerization processes. Dart Drop for Sample B (a film made of an LDPE made using metallocene catalyst in a gas phase polymerization process) was 362 g/mil, and Dart Drop for Sample C (a film made of an LDPE made using Ziegler-Natta catalyst in a gas please polymerization process) was 112 g/mil. The invention polymers also showed improvement in Puncture properties, which reflect the resistance of a stretch wrap film to the penetration of a probe. As reflected in Table V, for Samples A and G, Puncture Peak Force values were 11.55 and 9.96 lb/mil, respectively and Puncture Break Energy values were 40.40 and 32.52 in-lb/mil, respectively. These values were greater than the values for all the comparative films made of polymers made using solution polymerization processes. That is, for Sample E (a film made of an VLDPE made using Ziegler-Natta catalyst in a solution polymerization process), the Peak Force was 10.02 lb/mil, and the Puncture Break Energy was 34.33 lb/mil. For Sample F (a film made of a VLDPE made using metallocene catalyst in a solution polymerization process), the Peak Force was 10.70 lb/mil, and the Puncture Break Energy was 35.29 in-lb/mil. The Puncture properties of films made of the invention polymers were also higher than the Puncture properties of polymers made using other gas phase polymerization processes. For Sample B (a film made of an LDPE made using metallocene catalyst in a gas phase polymerization process), the Peak Force was 9.98 lb/mil and the Puncture Break Energy 31.25 in-ft/mil. For Sample C (a film made of LDPE made using Ziegler-Natta catalyst in a gas phase polymerization process) the Peak Force was 8.13 lb/mil and the Puncture Break Energy was 23.46 in-ft/mil.

TABLE V

| | A | B | C | D | E | F | G |
|---|---|---|---|---|---|---|---|
| Tensile @ Yield MD (psi) | 1078 | 1335 | 1447 | 738 | 1087 | 934 | 1054 |
| Tensile @ Yield TD (psi) | 1080 | 1397 | 1618 | 713 | 1118 | 921 | 1050 |
| Tensile at 200% MD (psi) | 1911 | 1901 | 1905 | 1812 | 2269 | 2684 | 1897 |
| Ultimate Tensile MD (psi) | 11,232 | 10,550 | 8,603 | 10,579 | 9,586 | 9,218 | 11,598 |
| Ultimate Tensile TD (psi) | 9,197 | 8,012 | 6,240 | 10,778 | 6,748 | 8,597 | 9,463 |
| Elongation @ Yield MD (%) | 6.8 | 6.2 | 5.9 | 8.8 | 6.5 | 7.3 | 6.9 |
| Elongation @ Yield TD (%) | 6.7 | 6.2 | 5.9 | 8.0 | 6.2 | 6.5 | 6.8 |
| Break Elongation MD (%) | 474 | 518 | 545 | 439 | 446 | 458 | 480 |
| Break Elongation TD (%) | 617 | 627 | 740 | 592 | 711 | 736 | 618 |
| 1% Secant Modulus MD (psi) | 25,300 | 36,270 | 37,330 | 14,630 | 27,360 | 22,520 | 25,080 |
| 1% Secant Modulus TD (psi) | 27,500 | 39,380 | 47,020 | 17,030 | 30,480 | 23,330 | 26,780 |
| Elmendorf Tear MD (g/mil) | 202 | 247 | 225 | 159 | 352 | 133 | 178 |
| Elmendorf Tear TD (g/mil) | 396 | 439 | 764 | 362 | 696 | 475 | 392 |
| Dart Drop Method A (g) | 773 | 442 | 145 | 1723 | 422 | 624 | 1651 |
| Dart Drop Method A (g/mil) | 623 | 362 | 112 | 1336 | 338 | 491 | 1289 |
| Gauge (mil) | | | | | | | |
| Average | 1.24 | 1.22 | 1.29 | 1.29 | 1.25 | 1.27 | 1.28 |
| Low | 1.10 | 1.13 | 1.15 | 1.09 | 1.15 | 1.19 | 1.14 |
| High | 1.34 | 1.31 | 1.40 | 1.52 | 1.34 | 1.36 | 1.38 |
| Haze (%) | 7.7 | 17.7 | 14.3 | 1.0 | 6.9 | 3.3 | 9.3 |
| Gloss 45 degree (I/I) | 58 191 | 44 47 | 51 208 | 92 178 | 70 197 | 76 212 | 58 >214 |
| Puncture Peak Force (lb) | 14.32 | 12.17 | 10.48 | 14.19 | 12.53 | 13.58 | 12.75 |
| Puncture Peak Force (lb/mil) | 11.55 | 9.98 | 8.13 | 11.00 | 10.02 | 10.70 | 9.96 |
| Break Energy (in-lb) | 50.09 | 38.13 | 30.26 | 48.09 | 42.92 | 44.82 | 41.66 |
| Break Energy (in-lb/mil) | 40.40 | 31.25 | 23.46 | 37.28 | 34.33 | 35.29 | 32.54 |
| Total Energy @ −29° F. (ft/lb) | 3.01 | 2.34 | 1.79 | 2.85 | 2.42 | 1.86 | 3.07 |
| Total Energy @ −RT (ft/lb) | * | 4.57 | 1.80 | * | 2.73 | 4.61 | * |
| Shrink MD (%) | 42 | 45 | 61 | 46 | 72 | 79 | 46 |
| Shrink TD (%) | −4 | −4 | −14 | −8 | −23 | −10 | −9 |

* greater than capacity

EXAMPLE 5

As reflected in Table VI, the Dart Drop of films made of invention polymers was also substantially higher than the Dart Drop of films made of higher density polymers made from a gas phase polymerization process using metallocene catalyst. In this example, the properties of unheated films made from invention VLDPEs were compared to unheated films made using non-invention LDPEs. Samples "AA" and "BB" were both non-invention films, made from polyethylenes having a density of 0.917 and a melt index of 3.5. Sample "AA" had a thickness of 1.54 mil average gauge, while Sample "BB" had a thickness of 0.85 mil average gauge. Samples "CC" and "DD" were invention films, made from a VLDPE. Sample "CC," made of a VLDPE with a melt index of 3.5 and density of 0.912, had an average gauge thickness of 1.49, and Sample "DD," made of a VLDPE with a melt index of 3.5 and a density of 0.912 had an average gauge thickness of 0.81. Both the invention and non-invention polymers were made using a gas phase polymerization process with a metallocene catalyst system. The data show that, even though the invention VLDPEs had lower density than the non-invention LDPEs, the Dart Drop toughness of the invention VLDPE films were higher than the Dart Drop toughness of the non-invention LDPE films. Specifically, average Dart Drop (in g/mil) for invention Samples "CC" and "DD" was over 40% greater than average Dart Drop for non-invention Samples "AA" and "BB."

TABLE VI

|  | AA | BB | CC | DD |
|---|---|---|---|---|
| Dart Drop |  |  |  |  |
| (g) | 964 | 610 | 1,338 | 826 |
| (g/mil) | 626 | 717 | 898 | 1,020 |
| Gauge (mil) |  |  |  |  |
| Average | 1.49 | 0.81 | 1.54 | 0.85 |
| Low | 1.50 | 0.81 | 1.43 | 0.77 |
| High | 1.56 | 0.88 | 1.54 | 0.85 |
| Puncture |  |  |  |  |
| Peak Force (lb) | 16.00 | 10.82 | 15.75 | 11.03 |
| Peak Force (lb/mil) | 10.39 | 12.73 | 10.57 | 13.61 |
| Break Energy (in-lb) | 58.20 | 38.31 | 59.37 | 38.62 |
| Break Energy (in-lb/mil) | 37.79 | 45.07 | 39.85 | 47.68 |

EXAMPLE 6

Another improved property exhibited by the invention VLDPEs is superior hot tack strength at low initiation temperatures, an important property for films. At an initiation temperature of 100° C., the Samples A–G discussed above were subjected to a Hot Tack test. The results are as follows: Hot tack was 6.56 for Sample A; 0.38 for Sample B; 0.28 for Sample C; 6.50 for Sample D; 2.35 for Sample E; 3.38 for Sample F; and 6.90 for Sample G. Thus, it was demonstrated that Samples A and G performed substantially better than the other samples in the Hot Tack tests.

EXAMPLE 7

Films formed of a 12 dg/min, 0.912 g/cm$^3$ mVLDPE film resin of the present invention with 5 to 40% by weight of LDPE were made according to the procedures described herein. Both LD200 and LD270 were used; these LDPEs are commercially available LDPE produces. The films were extrusion coated onto Kraft paper, and the mechanical properties and sealing properties were measured. The results are shown in Table VII for mechanical properties, Table VIII for hot tack strengths, and Table IX for heat seal strengths.

TABLE VII[a]

Mechanical Properties

|  | 5% A | 10% A | 20% A | 40% A | 5% B | 10% B | 20% B | 40% B | 100% B[b] |
|---|---|---|---|---|---|---|---|---|---|
| MD Elmendorf Tear (g) | 424 | 374 | 280 | 178 | 492 | 405 | 310 | 206 | 112 |
| TD Elmendorf Tear (g) | 422 | 405 | 292 | 219 | 498 | 465 | 304 | 235 | 109 |
| Puncture Break Energy (J) | 0.67 | 0.49 | 0.30 | 0.25 | 0.73 | 0.52 | 0.37 | 0.32 | 0.14 |

[a]A = LD200, B = LD270
[b]control sample (no mVLDPE)

TABLE VIII[a]

Hot Tack Strength (N/15 mm)

|  | 5% A | 10% A | 20% A | 40% A | 5% B | 10% B | 20% B | 40% B | 100% B[b] |
|---|---|---|---|---|---|---|---|---|---|
| 100° C. | 2.7 | 1.7 | 1.5 | 1.1 | 1.4 | 2.5 | 1.9 | 1.2 | — |
| 105° C. | 3.3 | 3.5 | 2.6 | 2.1 | 3.3 | 4.0 | 3.1 | 3.4 | 1.4 |
| 110° C. | 3.9 | 4.4 | 3.2 | 3.5 | 3.8 | 4.1 | 4.4 | 3.5 | 4.2 |
| 115° C. | 4.5 | 4.2 | 4.1 | 3.9 | 3.6 | 4.5 | 4.5 | 4.0 | 4.2 |
| 120° C. | 4.7 | 4.6 | 5.4 | 4.2 | 5.0 | 5.8 | 4.2 | 5.1 | 4.1 |
| 125° C. | 5.9 | 5.7 | 4.6 | 4.3 | 5.4 | 6.4 | 4.7 | 5.1 | 3.2 |

[a]A = LD200, B = LD270
[b]control sample (no mVLDPE)

TABLE IX[a]

Heat Seal Strength (N)

|  | 5% A | 10% A | 20% A | 40% A | 5% B | 10% B | 20% B | 40% B | 100% B[b] |
|---|---|---|---|---|---|---|---|---|---|
| 90° C. | — | 2.4 | 1.7 | 0.9 | — | — | 1.1 | 1.9 | — |
| 95° C. | 3.0 | 5.3 | 3.7 | 3.4 | 1.7 | 3.4 | 4.6 | 4.0 | 2.0 |
| 100° C. | 6.7 | 7.4 | 7.5 | 5.3 | 3.1 | 10.5 | 8.0 | 6.6 | 3.1 |
| 105° C. | 9.3 | 9.4 | 9.0 | 9.6 | 10.8 | 8.9 | 9.0 | 9.3 | 8.4 |
| 110° C. | 9.6 | 10.0 | 9.8 | 9.8 | 10.8 | 12.2 | 9.8 | 10.4 | 11.5 |

TABLE IX[(a)]-continued

| | Heat Seal Strength (N) | | | | | | | | |
|---|---|---|---|---|---|---|---|---|---|
| | 5% A | 10% A | 20% A | 40% A | 5% B | 10% B | 20% B | 40% B | 100% B[(b)] |
| 115° C. | 10.4 | 10.7 | 9.9 | 10.0 | 11.6 | 13.2 | 10.5 | 10.4 | 9.5 |
| 120° C. | 11.1 | 11.3 | 10.4 | 10.2 | 14.1 | 15.7 | 11.5 | 11.9 | 10.6 |
| 125° C. | 11.2 | 12.2 | 10.7 | 10.0 | 12.3 | 14.8 | 12.0 | 12.1 | 10.1 |
| 130° C. | 11.7 | 11.4 | 10.6 | 10.4 | 12.6 | 15.1 | 11.5 | 10.4 | 10.1 |
| 135° C. | 11.6 | 12.4 | 9.9 | 10.1 | 12.5 | 14.4 | 10.6 | 11.5 | 9.7 |
| 140° C. | 11.4 | 11.9 | 10.1 | 9.2 | 13.6 | 14.3 | 9.7 | 10.1 | 9.1 |

[(a)]A = LD200, B = LD270
[(b)]control sample (no mVLDPE)

The data in Tables VIII–IX show several advantageous properties of films or coatings made from LDPE/mVLDPE blends of the present invention. All of the blends showed improved machine direction and transverse direction Elmendorf Tear strength, and improved puncture break energy, compared to the conventional LDPE film (the control sample, "100% B"). In the hot tack strength measurements (Table VIII), the blends generally showed superior adhesion at most temperatures, and particularly at higher temperatures, compared to the LDPE control sample. Similarly, the heat seal strengths of the LDPE/mVLDPE blends were generally higher than for the LDPE control sample at most temperatures.

EXAMPLE 8

The following materials are compared in this example:

TABLE X

Material for Forming Films Tested in Tables XIa–XVIIb

| Product Family | Grade Name* | MI, g/10 min | Wt. % Comonomer | Density, g/cc |
|---|---|---|---|---|
| LDPE | LD-200.48 | 7.5 | | 0.918 |
| EVA | UL-01418 | 14 | 18 | |
| EMA | TC-220 | 5 | 24 | |
| EnBA | XW-25.AL | 7.8 | 25 | |
| Ionomer | Iotek ™ 8030 (Na) | 2.8 | | 0.956 |
| EAA | Escor ™ 5100 | 6.5 | 6.5 | |
| Plastomer | Exact ™ 3040 | 16 | | 0.900 |
| Mvldpe | ECD-330 | 12 | | 0.912 |

*All products produced by ExxonMobil Chemical Company. ECD-330 is a developmental material.

Monolayer coatings were applied using a 3.5 inch extruder. The 750 mm diameter chill roll had a matte finish and was held at 15° C. throughout the run. The substrate used was 70# Kraft paper which was corona treated at 10 kW prior to coating. The air gap was maintained at 150 mm. Target coating thicknesses were 15, 25 and 50 g/m².

Tests for processability were conducted according to established ETC protocols. Resin extrudability is determined by measuring motor load, pressure, and melt temperatures at 25, 50, and 150 rpm. Resin neck-in is measured at 25 rpm output onto untreated paper at 25, 50, 100, and 200 meters per minute (mpm) line speeds. Maximum drawdown is determined by extruding resin at 25 rpm output onto untreated paper and increasing line speed at 10 meters per minute per second acceleration ECD-330 (12 dg/min, 0.912 g/cc) and LD200.48 (7.5 dg/min,-0.915 g/cc) were extruded in blends of 0, 20, 40, 60, 80, and 100 weight percent ECD-330. ECD-330 was extruded at 100% only for processing comparisons and the 25 and 50 g/m² coating weights. The ECD-330 used in this work was produced at MBPP on Nov. 19, 2000. It was formulated with 200 ppm Irganox 1076.

The linear comparisons were Exact 3040 (16.5 dg/min, 0.900 g/cc), Dow 3010 (5.4 dg/min, 0.921 g/cc), Dow Affinity PT1450 (7.5 dg/min, 0.902), Nova Sclair 61C (5.3 dg/min, 0.919). Exact 3040 and Nova Sclair 61C were blended with 20 weight percent LD200.48. Dow Affinity PT1450 was run at 100% and blended with 20 weight percent LD200.48. Also included in the competitive comparison was UL02020 (20 dg/min, 20 weight percent VA).

Films were tested for Elmendorf tear, tensile strength, and puncture resistance. 15 g/m² samples were tested for burst strength by standard procedures for a Perkins-Bowthruck Bond Tester, Type CSR-710-64 at room temperature (~25° C.) which can be used to quantify coating efficiency, or relative bond strength to the paper.

Processing Comparisons

Processing data are shown in Tables XIa and XIb. Data from the DPUT-1212 evaluation is included. The motor load values at all three screw speeds overlay indicating that the DPUT-1212 and ECD-330 had similar extrudability. As expected, adding LDPE reduces motor load. Similar trends are seen for head pressures. These results show neck-in at 100 mpm and maximum drawdown, respectively, for ECD-330 and DPUT-1212. These properties are also the same between the two resins.

Neck-in as a function of LDPE content in ECD-330 at four different line speeds is given in Table XIa. There is a significant reduction in neck-in with 20 weight percent added L9200.48, but little significant change at 40 weight percent and higher.

Motor load results for an 80/20 ECD-330/LD200.48 blend and the linear comparative samples show that the ECD-330 blend processes more easily than Dow 3010 and Nova Sclair 61C which can be expected with the much lower melt indices for the LLDPE resins. Processability for the ECD-330 blend is similar to the Affinity PT1450 resin and LD-blend and is more difficult than the higher melt index Exact 3040.

At higher line speeds, the ECD-330 blend has very good neck-in which is matched only by the Affinity PT1450/LD blend and Exact 3040. Neck-in for Dow 3010, Nova Sclair 61C, and unblended PT1450 are much worse. The results show that maximum drawdown for the linear resins with unblended PT1450 and Exact 3040 having the greatest attainable line speeds. ECD-330 falls third, but can be run at much greater line speed/drawdown than Dow 3010, Nova Sclair 61C, and PT1450 with LDPE.

Physical Properties

Mechanical properties are given in Tables XIIa and XIIb for the 15 g/m² samples, Tables 3a and 3b for the 25 g/m² samples and 4a and 4b for the 50 g/m² samples.

The property trends are similar for all three coating weights in the LDPE, LDPE/ECD-330 blends. The results show burst test data for the 15 g/m² samples which indicates that LDPE has better adhesion to paper under the extrusion conditions used, and further show that Elmendorf tear and puncture energy are negatively affected by the addition of LDPE.

As shown by burst test results for the linear comparative resins and an EVA, the ECD-330/LDPE blend has relatively poor adhesion to Kraft paper and is only better than the Dow Affinity PT1450. Mechanical properties data for the 25 g/m² coating samples shows. Tensile break energy for ECD-330 and the ECD-330/LDPE blend is relatively good. Only the Dow 3010 and Nova Sclair 61C were better, which is due at least part to the much higher molecular weight of the LLDPE resins. Elmendorf tear, especially for the unblended ECD-330, was quite good. Puncture break energy was slightly better for ECD-330 than the other linear resins. Dow Affinity PT1450 had very good puncture resistance.

Hot Tack and Heat Seal Results

Hot tack and heat seal comparisons between ECD-330 and DPUT-1212 at 25 g/m² coating weight show that ECD-330 has far superior hot tack and heat seal performance to DPUT-1212. This may be due to a slightly lower resin density for ECD-330 or less surface oxidation. TOF-SIMS analysis of the ECD-330 in this work shows surface oxygen concentration to be below detectable limits indicating that the resin was not degraded significantly during processing.

Hot tack comparisons for the ECD-330/LDPE blends at 15, 25, and 50 g/m² coating weights, respectively. The general trends in these plots is that LD200.48 has the worst hot tack strength and increasing the amount of ECD-330 in the blend improves hot tack strength. The trends become more evident at thicker coatings.

Nova Sclair 61C has the worst hot tack strength, followed by Dow 3010. Dow 3010 has good hot tack strength at thicker gauges, but at relatively high temperatures, greater 115° C. Dow Affinity PT1450 and the PT1450/LDPE blend have slightly better hot tack strength at lower temperatures than ECD-330, i.e. 90° C. and below, but significantly lower hot tack strength above 100° C., Exact 3040 has a similar hot tack strength profile compared to ECD-330, but is shifted to approximately 10° C. lower temperatures. As expected, UL02020 has the lowest temperature hot tack strength.

Heat seal strengths for ECD-330/LDPE blends follow similar trends to the hot tack data. Table XVIa gives heat seal data for the ECD-330/LDPE blends at 25 g/m² coating weight. Increasing the amount of ECD-330 in the blend improves heat seal strength slightly relative to LDPE. ECD-330 as a single component has significantly better heat seal strength than the blends or LDPE.

Heat seal strength for the competitive linear resins at 25 g/m² coating weight show that ECD-330 has similar seal performance to Exact 3040, but at approximately 5° C. higher temperatures. Dow 3010 and Nova Sclair 61C have acceptable heat seals only above 110° C.

TABLE XIa

Processing data for ECD-330/LD200.48 resins and blends.

| Resin | LD200.48 | ECD-330 | ECD-330 | ECD-330 | ECD-330 | ECD-330 |
|---|---|---|---|---|---|---|
| % LD200 | 100 | 80 | 60 | 40 | 20 | 0 |
| Set Temperature (° C.) | 295 | 295 | 295 | 295 | 295 | 295 |
| 25 RPM | | | | | | |
| Motor Load (amps) | 58 | 62 | 67 | 71 | 76 | 83 |
| Head Pressure (bar) | 33 | 40 | 39 | 44 | 45 | 52 |
| Adapter Temperature (° C.) | 299 | 299 | 300 | 300 | 300 | 300 |
| Pipe Temperature (° C.) | 296 | 296 | 296 | 296 | 296 | 296 |
| 50 RPM | | | | | | |
| Motor Load (amps) | 86 | 94 | 103 | 107 | 118 | 131 |
| Head Pressure (bar) | 42 | 54 | 54 | 55 | 69 | 57 |
| Adapter Temperature (° C.) | 297 | 299 | 300 | 300 | 301 | 302 |
| Pipe Temperature (° C.) | 295 | 296 | 297 | 297 | 297 | 298 |
| 150 RPM | | | | | | |
| Motor Load (amps) | 152 | 165 | 180 | 193 | 210 | 229 |
| Head Pressure (bar) | 59 | 69 | 72 | 77 | 79 | 87 |
| Adapter Temperature (° C.) | 286 | 295 | 301 | 306 | 310 | 314 |
| Pipe Temperature (° C.) | 288 | 295 | 299 | 303 | 306 | 319 |
| Output@50 rpm (kg/5 min) | 6.69 | 6.84 | 7.00 | 7.08 | 7.23 | 7.36 |
| Output at 50 RPM (kg/hr) | 80 | 82 | 84 | 85 | 87 | 88 |
| Specific Output 50 rpm (kg/hr/rpm) | 1.60 | 1.64 | 1.68 | 1.70 | 1.74 | 1.76 |
| Spec.c Energy Consump. (kJ/kg) | 328 | 351 | 376 | 386 | 417 | 454 |
| Neck-in at 25 mpm (cm) | 3.7 | 4.0 | 4.5 | 5.8 | 10.0 | 19.9 |
| Neck-in at 50 mpm (cm) | 3.3 | 3.5 | 3.9 | 4.7 | 7.7 | 23.8 |
| Neck-in at 100 mpm (cm) | 3.1 | 3.3 | 3.6 | 4.2 | 6.4 | EW |
| Neck-in at 200 mpm (cm) | MB | MB | MB | 4.2 | 6.1 | EW |
| Max. Drawdown (mpm) | 124.5 | 141.5 | 171.5 | 218 | 381 | ** |

TABLE XIa-continued

Processing data for ECD-330/LD200.48 resins and blends.

| Resin | LD200.48 | ECD-330 | ECD-330 | ECD-330 | ECD-330 | ECD-330 |
|---|---|---|---|---|---|---|
| 15 g/m² Sample | | | | | | |
| Screw Speed (rpm) | 27.9 | 27.6 | 27.2 | 27.3 | 26.8 | 19.9 |
| Neck-in (cm) | 3 | 3.3 | 3.7 | 4 | 5.5 | ** |
| Motor Load (amps) | 60 | 85 | 71 | 74 | 77 | 69 |
| Melt Pressure (bar) | 31 | 42 | 43 | 36 | 35 | 38 |
| Melt Temperature (° C.) | 299 | 300 | 300 | 300 | 300 | 300 |
| 25 g/m² Sample | | | | | | |
| Screw Speed (rpm) | 46.5 | 46 | 45.3 | 45.5 | 44.6 | 33.1 |
| Neck-in (cm) | 3 | 33 | 3.7 | 4 | 5.8 | 26.5 |
| Motor Load (amps) | | 85 | 95 | 101 | 105 | 102 |
| Melt Pressure (bar) | | 42 | 39 | 41 | 39 | 40 |
| Melt Temperature (° C.) | | 300 | 301 | 300 | 300 | 301 |
| 50 g/m² Sample | | | | | | |
| Screw Speed (rpm) | 93 | 92 | 90.6 | 91 | 89.2 | 66.2 |
| Neck-in (cm) | 3 | 3.3 | 3.7 | 4.3 | 6.5 | 23 |
| Motor Load (amps) | 113 | 122 | 135 | 147 | 160 | 152 |
| Melt Pressure (bar) | 39 | 48 | 47 | 48 | 46 | 46 |
| Melt Temperature (° C.) | 300 | 302 | 303 | 300 | 304 | 302 |

TABLE XIb

Processing data for competitive linear resins and an EVA.

| Resin | Exact 3040 | Dow 3010 | Affinity PT1450 | PT1450 | Nova61C | UL02020 |
|---|---|---|---|---|---|---|
| % LD200 | 20 | | | 20 | 20 | |
| Set Temperature (° C.) | 295 | 295 | 295 | 295 | 295 | 240 |
| 25 RPM | | | | | | |
| Motor Load (amps) | 72 | 92 | 84 | 77 | 92 | 70 |
| Head Pressure (bar) | 44 | 64 | 48 | 41 | 55 | 44 |
| Adapter Temperature (° C.) | 299 | 303 | 300 | 300 | 304 | 243 |
| Pipe Temperature (° C.) | 296 | 299 | 297 | 297 | 299 | 240 |
| 50 RPM | | | | | | |
| Motor Load (amps) | 109 | 136 | 123 | 114 | 135 | 100 |
| Head Pressure (bar) | 52 | 83 | 65 | 61 | 84 | 52 |
| Adapter Temperature (° C.) | 298 | 308 | 301 | 300 | 310 | 243 |
| Pipe Temperature (° C.) | 295 | 302 | 297 | 297 | 303 | 241 |
| 150 RPM | | | | | | |
| Motor Load (amps) | 202 | 202 | 210 | 194 | 233 | 157 |
| Head Pressure (bar) | 70 | 70 | 82 | 78 | 118 | 65 |
| Adopter Temperature (° C.) | 301 | 301 | 310 | 306 | 327 | 243 |
| Pipe Temperature (° C.) | 299 | 299 | 305 | 303 | 318 | 243 |
| Output @ 50 rpm (kg/5 min) | 7.26 | 6.93 | 7.31 | 7.16 | 6.76 | 7.71 |
| Output at 50 RPM (kg/hr) | 87 | 83 | 88 | 86 | 81 | 93 |
| Spec. Output @ 50 rpm (kg/hr/rpm) | 1.74 | 1.66 | 1.76 | 1.72 | 1.62 | 1.86 |
| Specific En. Cons. (kJ/kg) | 383 | 501 | 429 | 406 | 510 | 331 |
| Neck-in at 25 mpm (cm) | 11.5 | 9.3 | 13.6 | 9.1 | 8.9 | 15.5 |
| Neck-in at 50 mpm (cm) | 9.1 | 8.8 | 12.7 | 7.3 | 8.1 | 15 |
| Neck-in at 100 mpm (cm) | 6.8 | 8.5 | 10.9 | 5.8 | 7.7 | 12 |
| Neck-in at 200 mpm (cm) | 6 | 8.4 | 9.7 | 5.5 | 7.6 | 9 |
| Max. Drawdown (mpm) | 502 | 264.5 | 506 | 298 | 249.5 | >600 |
| 15 g/m² Sample | | | | | | |
| Screw Speed (rpm) | 26.5 | 27.8 | 26.9 | 27.3 | 29.2 | 25.7 |
| Neck-in (cm) | 5.8 | 7.9 | 9.3 | 5.4 | 7.4 | 12.3 |
| Motor Load (amps) | 70 | 98 | 85 | 79 | 102 | 71 |

TABLE XIb-continued

Processing data for competitive linear resins and an EVA.

| Resin | Exact 3040 | Dow 3010 | Affinity PT1450 | PT1450 | Nova61C | UL02020 |
|---|---|---|---|---|---|---|
| Melt Pressure (bar) | 32 | 55 | 41 | 38 | 57 | 38 |
| Melt Temperature (° C.) | 298 | 302 | 300 | 300 | 304 | 244 |
| 25 g/m² Sample | | | | | | |
| Screw Speed (rpm) | 44.2 | 46.4 | 44.8 | 45.5 | 48.6 | 42.9 |
| Neck-in (cm) | 6.2 | 8 | 9.8 | 5.5 | 7.6 | 12 |
| Motor Load (amps) | 102 | 125 | | 106 | 127 | 90 |
| Melt Pressure (bar) | 38 | 60 | 44 | 41 | 60 | 40 |
| Melt Temperature (° C.) | 299 | 303 | 300 | 301 | 304 | 244 |
| 50 g/m² Sample | | | | | | |
| Screw Speed (rpm) | 88.4 | 92.8 | 89.6 | 91 | 97.2 | 85.8 |
| Neck-in(cm) | 7.7 | 8.2 | 10.6 | 6.2 | 8 | 11.6 |
| Motor Load (amps) | 150 | 187 | 166 | 153 | 192 | 122 |
| Melt Pressure (bar) | 46 | 75 | 51 | 48 | 81 | 44 |
| Melt Temperature (° C.) | 301 | 310 | 303 | 303 | 315 | 246 |

TABLE XIIa

Mechanical properties for ECD-330/LDPE blends at 15 g/m² coating weights.

| | Notebook 22249-043- | | | | | |
|---|---|---|---|---|---|---|
| | 001 | 002 | 005 | 008 | 0011 | 014 |
| | | | Resin | | | |
| | Paper | LD200 | ECD330 | ECD330 | ECD330 | ECD330 |
| | | | % LDPE | | | |
| | | 100 | 80 | 60 | 40 | 20 |
| | | | Coat Weight (g/m²) | | | |
| | | 15 | 15 | 15 | 15 | 15 |
| Tensile Strength (lb) | | | | | | |
| MD | 49 | 49 | 48 | 46 | 46 | 48 |
| TD | 29 | 27 | 28 | 30 | 27 | 28 |
| Tensile Strength (psi) | | | | | | |
| MD | 15400 | 13500 | 13400 | 12700 | 12900 | 13200 |
| TD | 8700 | 770 | 8000 | 8300 | 7800 | 8000 |
| Break Energy (in-lb) | | | | | | |
| MD | | 3.9 | 3.3 | 3.3 | 2.9 | 2.6 | 3.0 |
| TD | | 2.5 | 2.4 | 2.5 | 2.8 | 2.3 | 2.4 |
| Elmendorf Tear (g) | | | | | | |
| MD | 60 | 80 | 90 | 110 | 120 | 190 |
| TD | 70 | 90 | 100 | 120 | 140 | 210 |
| Puncture (coat up) | | | | | | |
| Peak Force (lb) | 10.6 | 10.8 | 11.8 | 10.2 | 10.6 | 11.0 |
| Break Energy (in-lb) | 1.1 | 1.8 | 1.5 | 1.7 | 1.8 | 1.9 |
| Puncture (paper up) | | | | | | |
| Peak Force (lb) | 10.3 | 10.9 | 12.5 | 11.1 | 11.6 | 11.7 |
| Break Energy (in-lb) | 1.2 | 1.3 | 1.4 | 1.4 | 1.4 | 1.4 |
| Burst Test | | | | | | |
| Coating efficiency (%) | | 94 | 86 | 98 | 74 | 61 |

TABLE XIIb

Mechanical properties for competitive resins at 15 g/m² coating weights.

| Notebook 22249-043- | 020 | 023 | 026 | 029 | 032 | 035 |
|---|---|---|---|---|---|---|
| Resin | 3040 | Exact Dow3010 | PT1450 | Affinity PT1450 | Nova61C | UL02020 |
| % LDPE | 20 | | | 20 | 20 | |
| Coat Weight (g/m²) | 15 | 15 | 15 | 15 | 15 | 15 |
| Tensile Strength (lb) | | | | | | |
| MD | 45 | 49 | 45 | 45 | 47 | 42 |
| TD | 26 | 28 | 25 | 24 | 26 | 27 |
| Tensile Strength (psi) | | | | | | |
| MD | 12100 | 13100 | 11800 | 12000 | 12400 | 11000 |
| TD | 7200 | 7900 | 6700 | 6700 | 7300 | 7500 |
| Break Energy (in-lb) | | | | | | |
| MD | 2.3 | 3.6 | 2.3 | 2.4 | 3.2 | 1.8 |
| TD | 2.0 | 2.4 | 2.0 | 1.7 | 2.2 | 2.2 |
| Elmendorf Tear (g) | | | | | | |
| MD | 230 | 160 | 250 | 160 | 130 | 80 |
| TD | 220 | 210 | 280 | 210 | 150 | 120 |
| Puncture (coat up) | | | | | | |
| Peak Force (lb) | 11.2 | 12.1 | 10.4 | 11.9 | 11.0 | 11.2 |
| Break Energy (in-lb) | 2.6 | 2.1 | 4.6 | 2.3 | 2.2 | 2.2 |
| Puncture (paper up) | | | | | | |
| Peak Force (lb) | 11.1 | 12.0 | 11.4 | 11.9 | 11.9 | 11.0 |
| Break Energy (in-lb) | 1.7 | 1.6 | 1.8 | 1.7 | 1.6 | 1.7 |
| Burst Test | | | | | | |
| Coating efficiency (%) | 94 | 98 | 33 | 34 | 100 | 100 |

TABLE XIIIa

Mechanical properties for ECD-330/LDPE blends at 25 g/m² coating weights.

| Notebook 22249-043- | 003 | 006 | 009 | 012 | 015 | 018 |
|---|---|---|---|---|---|---|
| Resin | LD200 | ECD330 | ECD330 | ECD330 | ECD330 | ECD330 |
| % LDPE | 100 | 80 | 60 | 40 | 20 | 0 |
| Coat Weight (g/m²) | 25 | 25 | 25 | 25 | 25 | 25 |
| Tensile Strength (lb) | | | | | | |
| MD | 49 | 50 | 50 | 45 | 47 | 47 |
| TD | 30 | 28 | 28 | 29 | 26 | 28 |
| Tensile Strength (psi) | | | | | | |
| MD | 12600 | 12900 | 12900 | 11800 | 11700 | 10000 |
| TD | 7600 | 7300 | 7400 | 7500 | 6800 | 7400 |
| Break Energy (in-lb) | | | | | | |
| MD | 3.3 | 3.4 | 3.2 | 2.4 | 2.7 | 2.4 |
| TD | 2.5 | 2.4 | 2.4 | 2.4 | 1.8 | 2.3 |
| Elmendorf Tear (g) | | | | | | |
| MD | 90 | 100 | 120 | 170 | 270 | 410 |
| TD | 100 | 110 | 150 | 200 | 290 | 410 |

TABLE XIIIa-continued

Mechanical properties for ECD-330/LDPE blends at 25 g/m² coating weights.

| | Notebook 22249-043- | | | | | |
|---|---|---|---|---|---|---|
| | 003 | 006 | 009 | 012 | 015 | 018 |
| | Resin | | | | | |
| | LD200 | ECD330 | ECD330 | ECD330 | ECD330 | ECD330 |
| | % LDPE | | | | | |
| | 100 | 80 | 60 | 40 | 20 | 0 |
| | Coat Weight (g/m²) | | | | | |
| | 25 | 25 | 25 | 25 | 25 | 25 |
| Puncture (coat up) | | | | | | |
| Peak Force (lb) | 13.3 | 12.1 | 11.0 | 11.5 | 12.5 | 12.4 |
| Break Energy (in-lb) | 1.6 | 2.3 | 2.4 | 2.3 | 2.5 | 3.5 |
| Puncture (paper up) | | | | | | |
| Peak Force (lb) | 12.4 | 11.6 | 12.9 | 12.2 | 12.7 | 11.8 |
| Break Energy (in-lb) | 1.5 | 1.3 | 1.5 | 1.7 | 1.7 | 2.5 |

TABLE XIIIb

Mechanical properties for competitive resins at 25 g/m² coating weights.

| | Notebook 22249-043- | | | | | |
|---|---|---|---|---|---|---|
| | 021 | 024 | 027 | 030 | 033 | 036 |
| | Resin | | | | | |
| | Exact 3040 | Dow3010 | Affinity PT1450 | PT1450 | Nova61C | UL02020 |
| | % LDPE | | | | | |
| | 20 | | | 20 | 20 | |
| | Coat Weight (g/m²) | | | | | |
| | 25 | 25 | 25 | 25 | 25 | 25 |
| Tensile Strength (lb) | | | | | | |
| MD | 47 | 47 | 46 | 44 | 45 | 46 |
| TD | 25 | 28 | 26 | 24 | 24 | 24 |
| Tensile Strength (psi) | | | | | | |
| MD | 11200 | 11300 | 11000 | 10600 | 10700 | 10700 |
| TD | 6100 | 7300 | 6400 | 6000 | 5900 | 6000 |
| Break Energy (in-lb) | | | | | | |
| MD | 2.3 | 3.2 | 2.3 | 2.1 | 2.8 | 2.0 |
| TD | 1.9 | 2.3 | 2.0 | 1.8 | 2.3 | 1.8 |
| Elmendorf Tear (g) | | | | | | |
| MD | 310 | 210 | 390 | 230 | 180 | 100 |
| TD | 340 | 270 | 390 | 300 | 220 | 130 |
| Puncture (coat up) | | | | | | |
| Peak Force (lb) | 12.1 | 11.9 | 11.4 | 9.6 | 10.7 | 10.9 |
| Break Energy (in-lb) | 3.2 | 2.6 | 7.9 | 10.0 | 2.6 | 2.6 |
| Puncture (paper up) | | | | | | |
| Peak Force (lb) | 11.5 | 11.7 | 11.3 | 12.6 | 13.9 | 10.4 |
| Break Energy (in-lb) | 2.2 | 2.0 | 4.0 | 2.1 | 1.8 | 1.7 |

TABLE XIVa

Mechanical properties for ECD-330/LDPE blends at 50 g/m² coating weights.

| | \multicolumn{6}{c}{Notebook 22249-043-} |
|---|---|---|---|---|---|---|
| | 004 | 007 | 010 | 013 | 016 | 019 |
| | \multicolumn{6}{c}{Resin} |
| | LD200 | ECD330 | ECD330 | ECD330 | ECD330 | ECD330 |
| | \multicolumn{6}{c}{% LDPE} |
| | 100 | 80 | 60 | 40 | 20 | 0 |
| | \multicolumn{6}{c}{Coat Weight (g/m²)} |
| | 50 | 50 | 50 | 50 | 50 | 50 |
| Tensile Strength (lb) | | | | | | |
| MD | 47 | 49 | 51 | 50 | 47 | 47 |
| TD | 30 | 30 | 26 | 31 | 29 | 31 |
| Tensile Strength (psi) | | | | | | |
| MD | 9700 | 9600 | 10500 | 9700 | 8900 | 8200 |
| TD | 6200 | 6200 | 5500 | 6400 | 5900 | 6500 |
| Break Energy (in-lb) | | | | | | |
| MD | 3.0 | 3.0 | 3.2 | 3.0 | 2.5 | 2.3 |
| TD | 2.6 | 2.7 | 1.9 | 2.8 | 2.3 | 2.6 |
| Elmendorf Tear (g) | | | | | | |
| MD | 120 | 160 | 210 | 320 | 530 | 740 |
| TD | 140 | 200 | 270 | 410 | 570 | 1280 |
| Puncture (coat up) | | | | | | |
| Peak Force (lb) | 11.8 | 11.3 | 11.9 | 11.7 | 11.9 | 12.4 |
| Break Energy (in-lb) | 3.1 | 3.8 | 3.7 | 4.4 | 7.8 | 16.0 |
| Puncture (paper up) | | | | | | |
| Peak Force (lb) | 11.9 | 12.9 | 12.5 | 13.0 | 13.0 | 12.3 |
| Break Energy (in-lb) | 2.2 | 2.3 | 2.6 | 2.8 | 3.3 | 9.3 |

TABLE XIVb

Mechanical properties for competitive resins at 50 g/m² coating weights.

| | \multicolumn{6}{c}{Notebook 22249-043-} |
|---|---|---|---|---|---|---|
| | 022 | 025 | 028 | 031 | 034 | 037 |
| | \multicolumn{6}{c}{Resin} |
| | Exact 3040 | Dow3010 | Affinity PT1450 | PT1450 | Nova61C | UL02020 |
| | \multicolumn{6}{c}{% LDPE} |
| | 20 | | | 20 | 20 | |
| | \multicolumn{6}{c}{Coat Weight (g/m²)} |
| | 50 | 50 | 50 | 50 | 50 | 50 |
| Tensile Strength (lb) | | | | | | |
| MD | 47 | 49 | 47 | 47 | 47 | 46 |
| TD | 29 | 29 | 27 | 28 | 27 | 26 |
| Tensile Strength (psi) | | | | | | |
| MD | 9200 | 9100 | 8500 | 8800 | 8900 | 8500 |
| TD | 5800 | 5700 | 5300 | 5600 | 5500 | 5200 |
| Break Energy (in-lb) | | | | | | |
| MD | 2.1 | 3.4 | 2.1 | 2.5 | 3.1 | 1.9 |
| TD | 2.5 | 2.6 | 2.2 | 2.3 | 2.2 | 2.1 |
| Elmendorf Tear (g) | | | | | | |
| MD | 560 | 400 | 680 | 460 | 340 | 150 |
| TD | 560 | 560 | 720 | 590 | 400 | 200 |

TABLE XIVb-continued

Mechanical properties for competitive resins at 50 g/m² coating weights.

| | \multicolumn{6}{c}{Notebook 22249-043-} |
|---|---|---|---|---|---|---|
| | 022 | 025 | 028 | 031 | 034 | 037 |
| | \multicolumn{6}{c}{Resin} |
| | Exact 3040 | Dow3010 | Affinity PT1450 | PT1450 | Nova61C | UL02020 |
| % LDPE | | | | 20 | 20 | |
| Coat Weight (g/m²) | 50 | 50 | 50 | 50 | 50 | 50 |
| Puncture (coat up) | | | | | | |
| Peak Force (lb) | 12.7 | 12.4 | 13.1 | 12.6 | 12.9 | 11.2 |
| Break Energy (in-lb) | 5.6 | 4.4 | 40.6 | 21.4 | 4.3 | 6.7 |
| Puncture (paper up) | | | | | | |
| Peak Force (lb) | 12.6 | 12.7 | 12.4 | 13.4 | 13.3 | 12.5 |
| Break Energy (in-lb) | 3.3 | 3.1 | 24.2 | 9.1 | 4.4 | 2.6 |

TABLE XVa

Hot tack and heat seal data for ECD-330/LDPE blends at 15 g/m² coating weights.

| | \multicolumn{5}{c}{Notebook 22249-043-} |
|---|---|---|---|---|---|
| | 002 | 005 | 008 | 011 | 014 |
| | \multicolumn{5}{c}{Resin} |
| | LD200 | ECD330 | ECD330 | ECD330 | ECD330 |
| % LDPE | 100 | 80 | 60 | 40 | 20 |
| Coat weight (g/m²) | | | | | |
| Temp. (° C.) | 15 | 15 | 15 | 15 | 15 |
| Hot Tack (N) | | | | | |
| 90 | 0.02 | 0.02 | 0.03 | 0.02 | 0.2 |
| 95 | 0.39 | 1.96 | 3.66 | 4.16 | 3.27 |
| 100 | 4.97 | 5.06 | 5.51 | 5.04 | 5.20 |
| 105 | 5.74 | 6.12 | 6.49 | 5.56 | 5.76 |
| 110 | 4.88 | 6.52 | 7.76 | 6.62 | 6.59 |
| 115 | 4.61 | 5.98 | 6.20 | 7.26 | 7.19 |
| 120 | 4.12 | 4.92 | 5.95 | 6.72 | 7.77 |
| 125 | 3.31 | 4.16 | 4.34 | 5.06 | 5.88 |
| 130 | 2.67 | 3.30 | 3.56 | 3.70 | 4.45 |
| Heat Seal (lbs) | | | | | |
| 85 | 0.14 | 0.21 | 0.16 | 0.53 | 0.16 |
| 90 | 0.95 | 0.97 | 1.68 | 1.15 | 0.67 |
| 95 | 1.61 | 0.90 | 1.61 | 1.17 | 1.06 |
| 100 | 2.18 | 1.09 | 2.60 | 1.40 | 1.36 |
| 105 | 2.20 | 2.40 | 3.43 | 1.93 | 2.02 |
| 110 | 2.60 | 2.48 | 3.36 | 2.71 | 2.61 |
| 115 | 2.28 | 2.87 | 3.09 | 3.18 | 2.84 |
| 120 | 2.40 | 2.46 | 3.07 | 3.05 | 2.83 |

TABLE XVb

Hot tack and heat seal data for competitive resins at 15 g/m² coating weights.

| | \multicolumn{6}{c}{Notebook 22249-043-} |
|---|---|---|---|---|---|---|
| | 020 | 023 | 026 | 029 | 032 | 035 |
| | \multicolumn{6}{c}{Resin} |
| | Ex. 3040 | Dow 3010 | PT1450 | PT1450 | Nova 61C | UL02020 |
| % LDPE | | | | 20 | 20 | 0 |
| Coat weight (g/m²) | | | | | | |
| Temp. (° C.) | 15 | 15 | 15 | 15 | 15 | 15 |
| Hot Tack (N) | | | | | | |
| 60 | | | | | | 0.04 |
| 65 | | | | | | 0.60 |
| 70 | | | | | | 3.06 |
| 75 | | | | | | 5.00 |
| 80 | 0.02 | | 0.02 | 0.02 | | 5.81 |
| 85 | 2.49 | | 0.84 | 0.08 | | 5.12 |
| 90 | 4.98 | 0.02 | 1.98 | 1.54 | | 4.12 |
| 95 | 5.86 | 0.02 | 2.30 | 2.68 | | 3.70 |
| 100 | 8.08 | 0.02 | 3.84 | 3.95 | 0.03 | |
| 105 | 8.81 | 4.60 | 5.14 | 5.23 | 0.03 | |
| 110 | 8.24 | 6.19 | 5.72 | 4.79 | 4.63 | |
| 115 | 6.70 | 6.74 | 5.89 | 4.34 | 6.80 | |
| 120 | 5.25 | 7.41 | 5.80 | 6.02 | 7.14 | |
| 125 | 3.66 | 7.51 | 4.48 | 3.39 | 6.03 | |
| 130 | | 7.92 | 2.54 | | 5.85 | |
| 135 | | 7.62 | | | | |
| 140 | | 5.63 | | | | |
| Heat Seal (lbs) | | | | | | |
| 60 | | | | | | 0.13 |
| 65 | | | | | | 1.29 |
| 70 | | | | | | 2.14 |
| 75 | 0.09 | | | | | 2.29 |
| 80 | 1.58 | | 0.35 | 0.08 | | 2.41 |
| 85 | 2.96 | | 0.83 | 0.58 | | 2.66 |
| 90 | 3.21 | | 0.91 | 0.94 | | 2.50 |
| 95 | 4.27 | 0.18 | 0.93 | 1.05 | 0.13 | 2.54 |
| 100 | 4.08 | 0.38 | 1.13 | 1.15 | 0.22 | |
| 105 | | 0.40 | 1.32 | 1.62 | 0.54 | |

TABLE XVb-continued

Hot tack and heat seal data for competitive resins at 15 g/m² coating weights.

Notebook 22249-043-

| | 020 | 023 | 026 | 029 | 032 | 035 |
|---|---|---|---|---|---|---|
| Resin | | | | | | |
| | Ex. 3040 | Dow 3010 | PT1450 | PT1450 | Nova 61C | UL02020 |
| % LDPE | | | | | | |
| | 20 | | | 20 | 20 | 0 |
| Coat weight (g/m²) | | | | | | |
| Temp. (° C.) | 15 | 15 | 15 | 15 | 15 | 15 |
| 110 | | 1.62 | 1.65 | | 1.67 | |
| 115 | | 2.06 | | | 3.66 | |
| 120 | | 3.04 | | | 3.38 | |
| 125 | | 3.22 | | | 3.98 | |
| 130 | | | | | 3.38 | |

TABLE XVIa

Hot tack and heat seal data for ECD-330/LDPE blends at 25 g/m² coating weights.

Notebook 22249-043-

| | 003 | 006 | 009 | 012 | 015 | 018 |
|---|---|---|---|---|---|---|
| Resin | | | | | | |
| | LD200 | ECD330 | ECD330 | ECD330 | ECD330 | ECD330 |
| % LDPE | | | | | | |
| | 100 | 80 | 60 | 40 | 20 | 0 |
| Coat Weight (g/m²) | | | | | | |
| Temp. (° C.) | 25 | 25 | 25 | 25 | 25 | 25 |
| Hot Tack (N) | | | | | | |
| 80 | | 0.07 | | | | |
| 85 | | 0.04 | | | | |
| 90 | 0.02 | 0.04 | 0.02 | 0.02 | 0.02 | 0.10 |
| 95 | 0.10 | 2.71 | 3.60 | 4.72 | 5.45 | 5.86 |
| 100 | 4.02 | 6.49 | 7.26 | 6.21 | 6.10 | 8.00 |
| 105 | 5.96 | 7.85 | 7.69 | 7.25 | 7.12 | 8.42 |
| 110 | 5.41 | 7.29 | 8.99 | 8.40 | 7.84 | 10.32 |
| 115 | 5.00 | 6.19 | 7.05 | 8.82 | 10.02 | 10.19 |
| 120 | 4.53 | 5.58 | 6.97 | 7.53 | 7.84 | 8.50 |
| 125 | 4.18 | 4.84 | 5.99 | 6.21 | 6.72 | 7.59 |
| 130 | 3.61 | | 4.84 | 4.92 | 5.96 | 7.42 |
| Heat Seal (lbs) | | | | | | |
| 85 | | 0.15 | 0.13 | 0.13 | 0.14 | 0.32 |
| 90 | 0.71 | 1.47 | 1.66 | 1.35 | 1.77 | 3.26 |
| 95 | 0.98 | 1.41 | 2.64 | 1.73 | 2.40 | 4.97 |
| 100 | 1.68 | 2.10 | 3.04 | 2.31 | 2.69 | 5.63 |
| 105 | 3.05 | 2.90 | 3.75 | 3.31 | 3.10 | 4.94 |
| 110 | 3.44 | 3.56 | 3.80 | 4.15 | 3.79 | 5.66 |
| 115 | 3.26 | 3.45 | 4.14 | 3.59 | 4.29 | |
| 120 | 3.10 | 3.42 | 3.76 | 3.53 | 3.89 | |
| 125 | | | | | 3.65 | |
| 130 | | | | | 3.64 | |

TABLE XVIb

Hot tack and heat seal data for competitive resins at 25 g/m² coating weight.

| | \multicolumn{6}{c}{Notebook 22249-043-} |
|---|---|---|---|---|---|---|
| | 021 | 024 | 027 | 030 | 033 | 036 |
| | \multicolumn{6}{c}{Resin} |
| | Exact 3040 | Dow3010 | PT1450 | PT1450 | Nova61C | UL02020 |
| | \multicolumn{6}{c}{% LDPE} |
| | 20 | | | 20 | 20 | |
| | \multicolumn{6}{c}{Coat Weight (g/m²)} |
| Temp. (° C.) | 25 | 25 | 25 | 25 | 25 | 25 |
| | \multicolumn{6}{c}{Hot Tack (N)} |
| 60 | | | | | | 0.07 |
| 65 | | | | | | 2.46 |
| 70 | | | | | | 4.53 |
| 75 | | | | | | 6.02 |
| 80 | 0.02 | | 0.03 | 0.02 | | 5.64 |
| 85 | 2.73 | | 1.66 | 0.27 | | 5.13 |
| 90 | 7.30 | 0.02 | 3.58 | 2.53 | | 4.61 |
| 95 | 9.32 | 0.02 | 4.58 | 4.41 | | 4.13 |
| 100 | 10.36 | 0.02 | 5.42 | 5.39 | 0.02 | |
| 105 | 10.11 | 2.94 | 6.46 | 6.19 | 0.23 | |
| 110 | 8.69 | 6.50 | 6.38 | 7.26 | 5.70 | |
| 115 | 7.06 | 7.53 | 6.57 | 7.08 | 7.11 | |
| 120 | 6.07 | 8.14 | 6.35 | 6.72 | 7.73 | |
| 125 | 4.53 | 8.73 | 4.17 | 4.67 | 6.29 | |
| 130 | 3.80 | 9.18 | 3.77 | 3.99 | 5.99 | |
| 135 | | 7.76 | | | | |
| | \multicolumn{6}{c}{Heat Seal (lbs)} |
| 60 | | | | | | 1.04 |
| 65 | | | | | | 2.00 |
| 70 | | | | | | 2.93 |
| 75 | 0.11 | | 0.24 | | | 2.98 |
| 80 | 1.60 | | 0.96 | | | 3.59 |
| 85 | 3.26 | | 1.32 | 0.55 | | 3.51 |
| 90 | 4.55 | | 1.58 | 1.05 | | 3.24 |
| 95 | 5.52 | 0.08 | 1.66 | 1.39 | 0.09 | 2.80 |
| 100 | 5.29 | 0.14 | 1.86 | 1.65 | 0.23 | |
| 105 | 5.24 | 0.27 | 2.34 | 1.86 | 0.32 | |
| 110 | | 0.90 | | 2.47 | 1.01 | |
| 115 | | 2.57 | | 2.30 | 4.04 | |
| 120 | | 3.03 | | 2.61 | 4.04 | |
| 125 | | 4.24 | | | 4.46 | |
| 130 | | 4.34 | | | 4.52 | |

TABLE XVIIa

Hot tack and heat seal data for ECD-330/LDPE blends at 50 g/m² coating weights

| | \multicolumn{6}{c}{Notebook 22249-043-} |
|---|---|---|---|---|---|---|
| | 004 | 007 | 010 | 013 | 016 | 019 |
| | \multicolumn{6}{c}{Resin} |
| | LD200 | ECD330 | ECD330 | ECD330 | ECD330 | ECD330 |
| | \multicolumn{6}{c}{% LDPE} |
| | 100 | 80 | 60 | 40 | 20 | 0 |
| | \multicolumn{6}{c}{Coat Weight (g/m²)} |
| Temp. (° C.) | 50 | 50 | 50 | 50 | 50 | 50 |
| | \multicolumn{6}{c}{Hot Tack (N)} |
| 80 | | | | | | |
| 85 | | | | | | |
| 90 | 0.02 | 0.04 | 0.03 | 0.02 | 0.02 | 0.02 |

TABLE XVIIa-continued

Hot tack and heat seal data for ECD-330/LDPE blends at 50 g/m² coating weights

Notebook 22249-043-

| Temp. (° C.) | 004 | 007 | 010 | 013 | 016 | 019 |
|---|---|---|---|---|---|---|
| | \multicolumn{6}{c}{Resin} | | | | | |
| | LD200 | ECD330 | ECD330 | ECD330 | ECD330 | ECD330 |
| | \multicolumn{6}{c}{% LDPE} | | | | | |
| | 100 | 80 | 60 | 40 | 20 | 0 |
| | \multicolumn{6}{c}{Coat Weight (g/m²)} | | | | | |
| Temp. (° C.) | 50 | 50 | 50 | 50 | 50 | 50 |
| 95 | 0.02 | 0.57 | 1.56 | 0.47 | 4.92 | 5.53 |
| 100 | 2.34 | 3.82 | 5.66 | 6.40 | 7.59 | 8.58 |
| 105 | 4.19 | 6.11 | 8.67 | 8.72 | 9.02 | 10.41 |
| 110 | 3.96 | 8.62 | 10.20 | 10.26 | 10.46 | 10.66 |
| 115 | 3.76 | 7.24 | 7.54 | 9.42 | 10.50 | 10.55 |
| 120 | 3.85 | 6.53 | 7.21 | 8.36 | 9.17 | 10.21 |
| 125 | 3.74 | 5.96 | 6.40 | 7.78 | 8.62 | 8.79 |
| 130 | 3.62 | 5.67 | 6.36 | 6.82 | 7.27 | 6.78 |
| | | | Heat Seal (lbs) | | | |
| 85 | | | 0.11 | | | 0.08 |
| 90 | 0.19 | 0.09 | 0.24 | 0.08 | 0.18 | 0.91 |
| 95 | 1.09 | 1.71 | 2.08 | 2.36 | 2.61 | 4.50 |
| 100 | 2.04 | 2.54 | 3.01 | 4.41 | 3.82 | 5.22 |
| 105 | 3.55 | 3.89 | 4.33 | 3.89 | 4.46 | 6.13 |
| 110 | 4.46 | 5.14 | 4.96 | 4.52 | 4.40 | 6.26 |
| 115 | 5.34 | 5.85 | 6.55 | 6.53 | 4.84 | 7.03 |
| 120 | 5.63 | 5.86 | 5.96 | 6.32 | 5.45 | 7.34 |
| 125 | 4.31 | 4.85 | 5.18 | 5.30 | 6.34 | |

TABLE XVIIb

Hot tack and heat seal data for competitive resins at 50 g/m² coating weight.

Notebook 22249-043-

| Temp. (° C.) | 022 | 025 | 028 | 031 | 034 | 037 |
|---|---|---|---|---|---|---|
| | \multicolumn{6}{c}{Resin} | | | | | |
| | Exact 3040 | Dow3010 | PT1450 | PT1450 | Nova61C | UL02020 |
| | \multicolumn{6}{c}{% LDPE} | | | | | |
| | 20 | | | 20 | 20 | |
| | \multicolumn{6}{c}{Coat Weight (g/m²)} | | | | | |
| Temp. (° C.) | 50 | 50 | 50 | 50 | 50 | 50 |
| | \multicolumn{6}{c}{Hot Tack (N)} | | | | | |
| 60 | | | | | | 0.037 |
| 65 | | | | | | 2.058 |
| 70 | | | | | | 3.646 |
| 75 | | | | | | 5.256 |
| 80 | 0.018 | | 0.025 | | | 6.67 |
| 85 | 3.697 | | 2.384 | | | 6.73 |
| 90 | 8.344 | 0.024 | 3.582 | 0.793 | | 5.882 |
| 95 | 10.521 | 0.025 | 4.957 | 4.253 | | 5.569 |
| 100 | 10.344 | 0.022 | 6.224 | 4.809 | 0.025 | |
| 105 | 9.931 | 2.714 | 7.906 | 7.726 | 0.025 | |
| 110 | 9.011 | 5.772 | 7.642 | 8.934 | 3.275 | |
| 115 | 7.795 | 8.005 | 7.443 | 8.524 | 5.517 | |
| 120 | 6.96 | 9.767 | 6.806 | 7.703 | 7.272 | |
| 125 | 6.47 | 10.693 | 6.42 | 6.483 | 7.835 | |
| 130 | 6.028 | 10.703 | | | 6.694 | |
| 135 | | 8.18 | | | 5.232 | |
| 140 | | 6.802 | | | | |

TABLE XVIIb-continued

Hot tack and heat seal data for competitive resins at 50 g/m² coating weight.

| | Notebook 22249-043- | | | | | |
|---|---|---|---|---|---|---|
| | 022 | 025 | 028 | 031 | 034 | 037 |
| | Resin | | | | | |
| | Exact 3040 | Dow3010 | PT1450 | PT1450 | Nova61C | UL02020 |
| | % LDPE | | | | | |
| | 20 | | | 20 | 20 | |
| | Coat Weight (g/m²) | | | | | |
| Temp. (° C.) | 50 | 50 | 50 | 50 | 50 | 50 |
| | Heat Seal (lbs) | | | | | |
| 60 | | | | | | 0.64 |
| 65 | | | | | | 2.27 |
| 70 | | | | | | 3.84 |
| 75 | | | | | | 4.35 |
| 80 | 0.14 | | 0.17 | 0.18 | | 4.59 |
| 85 | 3.48 | | 1.58 | 1.33 | | 4.67 |
| 90 | 5.00 | | 2.37 | 2.25 | | 4.36 |
| 95 | 6.57 | 0.05 | 2.80 | 2.64 | | |
| 100 | 6.33 | 0.06 | 2.98 | 2.91 | 0.19 | |
| 105 | 6.69 | 0.16 | 3.11 | 3.09 | 0.13 | |
| 110 | | 0.22 | 3.34 | 3.45 | 0.31 | |
| 115 | | 0.36 | 4.00 | 3.37 | 0.46 | |
| 120 | | 2.69 | 3.85 | 3.67 | 4.34 | |
| 125 | | 4.95 | | | 6.61 | |
| 130 | | 5.36 | | | 6.01 | |
| 135 | | 5.66 | | | 7.59 | |
| 140 | | 6.29 | | | | |

Additionally, Environmental Stress Crack Resistance can be important for containing fatty products, detergents, or other similarly aggressive chemicals. In general, the linear polymers display high ESCR relative to conventional coating polymers. Additionally, ESCR is improved by reducing the crystallinity of the coating polymer. At less than 60% LDPE addition, the 0.912 density mVLDPE produced ESCR results of greater than 1000 hours.

TABLE XVIII

Environmental Stress Crack Resistance (ASTM D-1693, F50, hours)

| % LD-200 | ECD-137 | ECD-330 |
|---|---|---|
| 0 | 600.000 | >1000 |
| 25 | 410.000 | >1000 |
| 30 | 120.000 | >1000 |
| 40 | 96.000 | >1000 |
| 60 | 135.000 | 190.000 |
| 75 | 68.000 | 43.000 |
| 100 | 90.000 | 90.000 |

In use in extrusion coating applications, the LDPE/mVLDPE blends are believed to show some or all of the following advantages over prior art materials: improved mechanical properties relative to LDPE and LLDPE; improved sealing performance relative to LDPE and LLDPE; at least equivalent processability to LLDPE; better adhesion to polypropylene relative to LDPE or LLDPE, thus eliminating or reducing the need for adhesive or tie layers; improved sealing performance relative to LDPE when used as a minor component; potentially can be coated in thinner products than LDPE or LLDPE, due to the additional integrity added by the VLDPE; and better organoleptics than LLDPE, and at least equivalent to or better than LDPE.

EXAMPLE 9

Monolayer films were made using either a VLDPE or an inventive blend of a VLPDE and a LDPE were made. Sample 1 comprised a m-VLDPE (EXCEED™321, density 0.912 g/cm³) made in a gas phase polymerization process. Sample 2 comprised a blend of 90% by weight of a m-VLDPE (EXCEED™ 321, density 0.912 g/Cm³) made in a gas phase polymerization process and 10% by weight of a low density polyethylene (ExxonMobil LD200.48, density 0.915, melt index 7.5 g/10 min). Sample 3 comprised a blend of 80% by weight of a m-VLDPE (EXCEED™ 321, density 0.912 g/cm³) made in a gas phase polymerization process and 20% by weight of a low density polyethylene (ExxonMobil LD200.48, density 0.915, melt index 7.5 g/10 min). Sample 4 comprised a blend of 90% by weight of a m-VLDPE (EXCEED™ 321, density 0.912 g/cm³) made in a gas phase polymerization process and 10% by weight of a low density polyethylene (ExxonMobil LD140.09, density 0.919, melt index 0.75 g/10 min). Sample 5 comprised a blend of 80% by weight of a m-VLDPE (EXCEED™ 321, density 0.912 g/cm³) made in a gas phase polymerization process and 20% by weight of a low density polyethylene (ExxonMobil LD140.09, density 0.919, melt index 0.75 g/10 min). Table XIX shows the properties of the monolayer films.

TABLE XIX

|  | Sample 1 | Sample 2 | Sample 3 | Sample 4 | Sample 5 |
|---|---|---|---|---|---|
| mVLDPE, % | 100% (ECD-321) | 90% (ECD-321) | 80% (ECD-321) | 90% (ECD-321) | 80% (ECD-321) |
| LDPE, % | 0% | 10% (LD200.48) | 20% (LD200.48) | 10% (LD140.09) | 20% (LD140.09) |
| Procesing: | | | | | |
| Melt Temp, deg F. | 385 | 382 | 379 | 382 | 382 |
| Head Pressure, psi | 3520 | 3410 | 3310 | 3590 | 3650 |
| Extruder Horsepower | 13.6 | 12.8 | 11.6 | 12.5 | 12.8 |
| Extruder Motor Load, % | 55.4 | 50 | 45.4 | 50.8 | 49.9 |
| Production Rate, lb/hr | 155 | 156 | 155 | 154 | 157 |
| Film Properties | | | | | |
| Tensile @ Yield, psi | | | | | |
| MD | 1,078 | 1,277 | 1,483 | 1,335 | 1,533 |
| TD | 1,080 | 1,336 | 1,340 | 1,359 | 1,467 |
| at 200% MD | 1,911 | 2,419 | 3,133 | 2,973 | 3,821 |
| Ultimate Tensile, psi | | | | | |
| MD | 11,232 | 9,882 | 8,805 | 10,237 | 9,639 |
| TD | 9,197 | 8,936 | 8,402 | 9,176 | 8,860 |
| Break Elongation, % | | | | | |
| MD | 474 | 503 | 487 | 493 | 462 |
| TD | 617 | 626 | 636 | 622 | 643 |
| 1% Secant Modulus, psi | | | | | |
| MD | 25,300 | 31,520 | 34,470 | 34,750 | 38,380 |
| TD | 27,500 | 39,480 | 45,230 | 45,170 | 48,550 |
| Elmendorf Tear, g/mil | | | | | |
| MD | 202 | 133 | 73 | 107 | 48 |
| TD | 396 | 499 | 649 | 637 | 567 |
| Dart Drop, g/mil (method A) | 623 | 765 | 379 | 767 | 266 |
| Gauge, mil (avg.) | 1.24 | 1.29 | 1.29 | 1.26 | 1.30 |
| Haze, % | 7.7 | 2.4 | 6.6 | 2.0 | 2.8 |
| Gloss 45 degree | 58 | 84 | 63 | 86 | 83 |
| Puncture | | | | | |
| Peak Force, lb/mil | 11.55 | 9.92 | 10.59 | 11.00 | 10.00 |
| BreakEnergy, in-lb/mil | 40.40 | 30.94 | 30.88 | 30.89 | 23.25 |
| Total Energy, ft/lb | >Capacity | >Capacity | 2.31 | >Capacity | 2.19 |
| Room Temp –29 Degrees F. | 3.01 | 1.62 | 1.74 | 1.48 | 1.82 |
| Shrink, % | | | | | |
| MD | 42 | 66 | 74 | 74 | 82 |
| TD | –4 | –18 | –17 | –17 | –17 |

EXAMPLE 10

Monolayer films were made using either an inventive VLDPE, a conventional VLDPE, a blend of an inventive VLPDE and a LDPE, or a blend a conventional VLPDE and a LDPE were made. Sample 6 comprised a m-VLDPE (EXCEED™ 321, density 0.912 g/cm³) made in a gas phase polymerization process. Sample 7 comprised an inventive blend of 90% by weight of a m-VLDPE (EXCEED™ 321, density 0.912 g/cm³) made in a gas phase polymerization process and 10% by weight of a low density polyethylene (ExxonMobil LD200.48, density 0.915, melt index 7.5 g/10 min.). Sample 8 comprised an inventive blend of 90% by weight of a m-VLDPE (EXCEED™ 321, density 0.912 g/cm³) made in a gas phase polymerization process and 10% by weight of a low density polyethylene (ExxonMobil LD140.09, density 0.919, melt index 0.75 g/10 min), Sample 9 (comparative) comprised a blend of 90% by weight of a VLDPE (Dow Attane 4201, density 0.9132 g/cm³) made in a solution polymerization process and 10% by weight of a low density polyethylene (ExxonMobil LD200.48, density 0.915, melt index 7.5 g/10 min). Sample 10 (comparative) comprised a blend of 90% by weight of a VLDPE (Dow Attane 4201, density 0.9132 g/cm³) made in a solution polymerization process and 10% by weight of a low density polyethylene (ExxonMobil LD140.09, density 0.919, melt index 0.75 g/10 min). Sample 6 (comparative) comprised a VLDPE (Dow Attane 4201, density 0.9132 g/cm³) made in a solution polymerization process.

Table XX shows the haze and gloss properties of the monolayer films. Samples 7 and 8 showed that the inventive blends comprising a VLDPE and a LDPE had clearer optical properties (i.e. lower haze and higher gloss) than the blends comprising a conventional VLDPE and a LDPE of Samples 9 and 10.

TABLE XX

|  | Sample 6 | Sample 7 | Sample 8 | Sample 9 Comparative | Sample 10 Comparative | Sample 11 Comparative |
|---|---|---|---|---|---|---|
| VLDPE, % | 100% (ECD-321) | 90% (ECD-321) | 90% (ECD-321) | 90% (Attane-4201) | 90% (Attane-4201) | 100% (Attane-4201) |
| LDPE, % | 0% | 10% (LD200.48) | 10% (LD140.09) | 10% (LD200.48) | 10% (LD140.09) | 0% |
| Haze, % | 7.7 | 2.4 | 2.0 | >4 | >2.5 | 6.9 |
| Gloss, 45 deg. | 58 | 84 | 86 | <80 | <84 | 70 |
| Gauge, avg. mil | 1.24 | 1.29 | 1.26 | target 1.25 | target 1.25 | 1.25 |

EXAMPLE 11

Peel tests were conducted to determine the adhesion of the 50 g/m² coatings to the OPP/aluminum substrate (polyethylene coatings on the OPP side of the substrate). Fifteen (15) mm wide specimens were cut in the machine direction of the samples. The polyethylene coating was peeled manually from the substrate to allow the coating and substrate to be clamped into opposing grips on a tensile tester. The grips are separated at a rate of 100 mm/minute and the force to delaminate is measured. Table XXI shows the results of the peel test. Only the LD200, Dow 3010, and LD261 samples could be peeled from the OPP. The other resins could not be peeled without tearing the substrate or causing delamination between the OPP and aluminum layers. The single-site catalyzed resins, ECD-330, Exact 3040, and Affinity PT1450, all had better adhesion to the OPP than the conventional LDPE, LLDPE, or EVA. It is interesting to note that Nova Sclair 61C LLDPE also had good adhesion to the OPP. One possible explanation is excessive oxidation in the Nova product due to very high extrusion temperatures, 332° C., which could have resulted in good adhesion.

TABLE XXI

|  | Peel Results (N/15 mm) |
|---|---|
| m-VLDPE (ECD-330) | not measurable |
| LDPE (ExxonMobil LD200) | 0.40 (1 sample, all others pulled apart easily) |
| LLDPE (Dow 3010) | 0.47 (average of 4 samples) |
| LEVA (ExxonMobil LD261) | 0.06 (average of 4 samples) |
| Plastomer (Exxxon Mobil Exact 3040) | not measurable |
| Plastomer Dow Affinity PT1450. | not measurable |
| LLDPE (Nova Sclair 61C LLDPE) | not measurable |

All patents, test procedures, and other documents cited herein, including priority documents, in this application are fully incorporated by reference to the extent such disclosure is not inconsistent with this application and for all jurisdictions in which such incorporation is permitted.

What is claimed is:

1. A polymer blend comprising:

(a) from 1 to 99% by weight of a copolymer derived from ethylene and one or more $C_3$–$C_{20}$ alpha olefin comonomers, said copolymer having:
  (i) a comonomer content of from 5 to 15 wt. %,
  (ii) a density of less than 0.916 g/cm³,
  (iii) a composition distribution breadth index in the range of from 55% to 70%,
  (iv) a molecular weight distribution Mw/Mn of from 2 to 3,
  (v) a molecular weight distribution Mz/Mw of less than 2; and (b) from 1 to 99% by weight of a low density polyethylene polymer having a density of from 0.916 to 0.928 g/cm³, wherein the sum of (a) and (b) is 100%.

2. The polymer blend of claim 1, wherein the copolymer has a melt index from 6 to 15 dg/min.

3. The polymer blend of claim 1, wherein the copolymer has melt index from 9 to 12 dg/min.

4. The polymer blend of claim 1, wherein the copolymer is a linear polymer.

5. The polymer blend of claim 1, wherein the blend comprises from 5 to 95% by weight of the low density polyethylene low density polyethylene polymer.

6. The polymer blend of claim 1, wherein the blend comprises from 5 to 35% by weight of the low density polyethylene polymer.

7. The polymer blend of claim 1, wherein the copolymer is a copolymer of ethylene and a $C_3$ to $C_{12}$ alpha-olefin.

8. The polymer blend of claim 1, wherein the copolymer is produced using a unbridged bis-Cp metallocene catalyst system.

9. The polymer blend of claim 1, wherein the copolymer is produced in a gas phase polymerization process.

10. The polymer blend of claim 1, wherein the copolymer is produced in a gas phase polymerization process at a pressure in the range of from 100 psig to 1000 psig.

11. The polymer blend of claim 1, wherein the copolymer is produced using an unbridged bis-Cp metallocene catalyst system in a gas phase polymerization process at a pressure an the range of from 100 psig to 1000 psig.

12. A polymer blend composition, comprising:

(i) a copolymer derived from ethylene and one or more $C_3$–$C_{10}$ alpha olefin comonomers, said copolymer having:
  (a) a comonomer content of from 5 to 15 wt. %,
  (b) a density of less than 0.916 g/cm³,
  (c) a composition distribution breadth index in the range of from 55% to70%,
  (d) a molecular weight distribution Mw/Mn of from 2 to 3,
  (e) a molecular weight distribution Mz/Mw of less than 2, and
  (f) a bi-model composition distribution; and (ii) a low density polyethylene polymer having a density of from 0.916 to 0.928 g/cm³.

13. A monolayer film comprising a polymer blend composition, the polymer blend composition comprising:
 (i) a copolymer derived form ethylene and one or more C3–C20 alpha olefin comonomer, said copolymer having:
  (a) a comonomer content of from 5 to 15 wt. %,
  (b) a density of less than 0.916 0.928 g/cm$^3$,
  (c) a composition distribution breadth index in the range of from 55% to 70%,
  (d) a molecular weight distribution Mw/Mn of from 2 to 3,
  (e) a molecular weight distribution Mz/Mw of less than 2, and
  (f) a bi-modal composition distribution; and
 (ii) a low density polyethylene polymer having a density of from 0.916 to 0.9280.928 g/cm$^3$.

14. The polymer blend composition of claim 12, wherein the copolymer has a melt index of 5 dg/min or less.

15. The polymer blend composition of claim 12, wherein the copolymer is a linear polymer.

16. The polymer blend composition of claim 12, wherein a bi-modal composition distribution is determined by two peaks in a TREF measurement.

17. The polymer blend composition of claim 12, wherein the blend comprises from 5 to 95% by weight of the low density polyethylene polymer.

18. The polymer blend composition of claim 12, wherein the blend comprises from 5 to 35% by weight of the low density polyethylene polymer.

19. The polymer blend composition of claim 12, wherein the copolymer is a copolymer of ethylene and a $C_3$ to $C_{12}$ alpha-olefin.

20. The polymer blend composition of claim 12, wherein the copolymer is produced using an unbridged bis-Cp metallocene catalyst system.

21. The polymer blend composition of claim 12, wherein the copolymer is produced in a gas phase polymerization process.

22. The polymer blend composition of claim 12, wherein the copolymer is produced in a gas phase polymerization process at a pressure in the range of from 100 psig to 1000 psig.

23. The polymer blend composition of claim 12, wherein the copolymer is produced using an unbridged bis-Cp metallocene catalyst system in a gas phase polymerization process at a pressure in the range of front 100 psig to 1000 psig.

24. The monolayer film of claim 13, wherein the copolymer has a melt index of 5 dg/min or legs.

25. The monolayer film of claim 13, wherein the copolymer is a linear polymer.

26. The monolayer film of claim 13, wherein a bi-modal composition distribution is determined by two peaks in a TREF measurement.

27. The monolayer film of claim 13, wherein the blend comprises from 5 to 95% by weight of the low density polyethylene polymer.

28. The monolayer film of claim 13, wherein the blend comprises from 5 to 35% by weight of the low density polyethylene polymer.

29. The monolayer film of claim 13, wherein the copolymer is a copolymer of ethylene and a $C_3$ to C12 alpha-olefin.

30. The monolayer film of claim 13, wherein the copolymer is produced using an unbridged bis-Cp metallocene catalyst system.

31. The monolayer film of claim 13, wherein the copolymer is produced in a gas phase polymerization process.

32. The monolayer film of claim 13, wherein the copolymer is produced in gas phase polymerization process at a pressure in the range of from 100 psig to 1000 psig.

33. The monolayer film of claim 13, wherein the copolymer is produced using an unbridged bis-Cp metallocene catalyst system in a gas phase polymerization process at a pressure in the range of from 100 psig to 1000 psig.

\* \* \* \* \*